United States Patent [19]
Scranton et al.

[11] Patent Number: 5,855,837
[45] Date of Patent: Jan. 5, 1999

[54] THICK, COMPOSITE PARTS MADE FROM PHOTOPOLYMERIZABLE COMPOSITIONS AND METHODS FOR MAKING SUCH PARTS

[75] Inventors: Alec B. Scranton, East Lansing; Bharath Rangarajan; Lindsay S. Coons, both of Lansing, all of Mich.

[73] Assignee: Michigan State University, East Lansing, Mich.

[21] Appl. No.: 467,729

[22] Filed: Jun. 6, 1995

[51] Int. Cl.⁶ .............................. B29C 35/08; C08F 2/50
[52] U.S. Cl. ...................... 264/494; 264/496; 522/25; 522/43; 522/100; 522/103; 522/7; 522/8; 522/11; 522/12; 522/44; 522/33; 522/83; 522/181; 522/188; 522/170; 428/417
[58] Field of Search ................. 522/43, 7, 8, 11, 522/12, 25, 33, 44, 100, 103; 430/269; 264/22, 494, 496

[56] References Cited

U.S. PATENT DOCUMENTS

| | | | |
|---|---|---|---|
| 4,156,035 | 5/1979 | Tsao et al. | 522/15 |
| 4,383,903 | 5/1983 | Ayano et al. | 204/159.16 |
| 4,561,951 | 12/1985 | Neckers | 522/33 |
| 4,757,330 | 7/1988 | Hull | 425/174.4 |
| 4,762,863 | 8/1988 | Sasaki et al. | 522/11 |
| 4,929,403 | 5/1990 | Audsley | 264/22 |
| 4,933,376 | 6/1990 | Sasaki et al. | 522/14 |
| 4,977,197 | 12/1990 | Sasaki et al. | 522/14 |
| 4,985,472 | 1/1991 | Aosai et al. | 522/64 |
| 5,110,513 | 5/1992 | Puvilland | 264/19 |
| 5,137,800 | 8/1992 | Neckers et al. | 430/281 |
| 5,340,653 | 8/1994 | Noren et al. | 428/423.1 |

OTHER PUBLICATIONS

Nelson et al., "The Role of the Triplet State in the Photosensitization of Cationic Polymerizations by Anthracene," *J. Polymer Sci.*, 33, 247–256 (1995).

*Primary Examiner*—Susan W. Berman
*Attorney, Agent, or Firm*—Leydig, Voit & Mayer, Ltd.

[57] ABSTRACT

A novel method for producing thick composite parts based upon photopolymerizable compositions is disclosed. The constituents of the photopolymerizable mixture comprise a monomer or monomers capable of polymerizing by free radical or cationic mechanisms, and a photoinitiator system which possesses an absorbance characteristic which is effectively reduced, or self-eliminating, upon initiation of the polymerization reaction. Parts having thicknesses up to 2 cm and thicker for varying end use applications are made by photopolymerizing such compositions. In addition, using such compositions composite parts can be made using a reinforcement material such as a glass fiber mat present in an amount by weight of from about 5 to about 70%.

31 Claims, 15 Drawing Sheets

STEP 1

STEP 2

STEP 3

STEP 4

STEP 5

THICK, COMPOSITE PARTS MADE FROM PHOTOPOLYMERIZABLE COMPOSITIONS AND METHODS FOR MAKING SUCH PARTS

FIELD OF THE INVENTION

This invention relates to parts and, more particularly, to the fabrication of thick, composite parts from readily photopolymerizable compositions.

BACKGROUND OF THE INVENTION

In general, a composite material may be defined as any material containing a reinforcement material which is supported by a binder material. Composite materials thus comprise a two-phase material having a discontinuous reinforcement material phase that is stiffer and/or stronger than the continuous binder (matrix) phase.

Composite materials having a resin binder phase offer substantial advantages over other materials such as metals, alloys and wood. Parts made from composites are thus often much lighter than parts made from steel or other materials, producing tremendous advantages for such composites in terms of the strength to weight ratios. Also, such composites often offer significant advantages over other materials as regards chemical and corrosion resistance and superior physical performance properties such as, for example, tensile properties.

Because of the advantages that may be derived from using composites, such materials have been proposed, and used, for a variety of end use applications ranging from various household products (e.g., bathtubs and shower enclosures) to the transportation industry (e.g., boat hulls and structural components of automobiles). Many of such end use applications require that the part be thick, i.e., at least one-half centimeter in thickness. Parts that can be produced in thicknesses of 0.1 cm or more will satisfy most applications.

Several different fabricating techniques have been developed that may be used to produce composites. One such fabricating technique is resin transfer molding (RTM). RTM may be described, in general, as a process which uses a mechanical pumping apparatus to transfer catalyst and a reactive resin from holding tanks into a closed mold containing a reinforcement material. A variety of reinforcement materials have been used as have various resins, including, for example, unsaturated polyesters, epoxies and vinyl esters. Often, to allow the reinforcement to fit into the mold quickly, the reinforcement is shaped into the desired geometry in a separate operation. The use of such preforms can result in faster cycle times because this eliminates the need for time-consuming placement of the fibers or other reinforcement material at the production press where the composite part is actually fabricated. In addition, these preforms allow for precise control of the fiber placement.

Fabricating composites using RTM has widespread potential because this technology can draw upon the vast amount of technology developed over many years for reaction injection molding (RIM) techniques. Thus, RIM fabrication has been in widespread use for a variety of commercial applications over many years.

However, while RTM has already found extensive application for the low volume production of a variety of specialty products, further developments are required to develop suitable high volume production techniques using RTM. The two fundamental requirements of high volume or mass production are low cost and high speed.

Because the resins actually begin to cure before they enter the mold in RTM fabricating techniques, such resins must meet some rather stringent requirements. The curing resin should exhibit a moderate viscosity plateau while it is still flowing into the mold, but should cure rapidly once the mold is filled.

The fact that the resins in RTM techniques begin to cure before they enter the mold make meeting the requirements of low cost and high speed very difficult. One traditional method to attempt to increase the speed of RTM is to operate the system with increased mold pressures to accommodate more rapid curing rates. Unfortunately, however, the increased operating pressure seems to inevitably result in increased costs due to the more expensive molds and pumping systems that are required to achieve such rapid curing rates.

In addition, there are many technical problems in RTM which arise in the step of filling the mold and impregnating the reinforcement material, such as a preform. The mold filling step can become very complicated since a reacting liquid is being forced through a porous medium (i.e., the preform or other reinforcement material). As this liquid reacts, it becomes more viscous (actually viscoelastic). Indeed, thermoset systems typically exhibit a tremendous increase in viscosity as such systems cure due to branching and cross linking in the system. Due to the moderately high initial (uncured) resin viscosities that increase during reaction, most current RTM processes exhibit significant mold filling problems associated with high operating pressures required to fill the mold and poor resin impregnation into the preform or other reinforcement material.

Even further, displacement and/or compression of the reinforcement material may often occur as the curing resin flows into the mold. Such displacement and/or compression can undermine a major advantage of RTM which is the precise control over the reinforcement material placement. A still further problem which can occur that results in considerable delay and downtime is the gelation of the resin in the transfer lines before entry into the mold. In addition to the problems previously described, further problems in utilizing RTM fabricating methods may arise because the process is typically not isothermal and the mold geometry of the part being fabricated may be highly irregular.

Still further, it has been found that it is important to differentiate flow on the microscale (i.e., within the reinforcement material itself such as a fiber bundle) from flow on a macroscale (e.g., between fiber bundles). It has thus been suggested that microflow improves the wetting and bonding at the reinforcement material (e.g., fiber)—resin matrix interface, and therefore improves the strength of the final composite. The time required for microflow depends upon the viscosity of the penetrating fluid (the reacting resin in RTM), but may be on the order of hours for large parts using commercial resins.

In summary, limitations in the use of RTM in high volume production arise from the fact that the resin systems used begin to react before the system enters the mold. This initial reaction thereby creates relatively high viscosities, requires high operating pressures, and results in poor wet-out of the reinforcement material as well as displacement thereof. Additionally, attempts to decrease the cycle time by increasing the operating pressure to accommodate faster reactions may actually exacerbate the problem by decreasing the quality of the composite by affording insufficient time for microflow. Finally, the high capital costs associated with high operating pressures create an inevitable trade-off between high speed and low cost under current RTM technology.

Another technique that may be used for producing thick and complex parts from composites or other materials is hand layup. While quite acceptable for customized applications, this method is obviously extremely labor intensive and offers no potential whatever for high volume or mass production.

Photopolymerizable compositions and technology for using such compositions has been known for many years and has been proposed for a wide variety of applications. As one illustrative example, it has been proposed to utilize certain photopolymerizable compositions including various fillers to form dental compositions. U.S. Pat. Nos. 4,762, 863, 4,933,376 and 4,977,197 to Sasaki et al. are patents disclosing suitable photopolymerizable compositions and reinforcing fillers.

Utilizing photopolymerizable compositions to fabricate a thick part can be difficult. Thus, with relatively thick parts, light intensity gradients will typically result, and such gradients can prevent satisfactory curing throughout the thickness of such parts. More particularly, what can often occur is the polymerization of thin layers adjacent to the surface where the light source is positioned. The thickness of this layer is determined by the distance the initiating light may effectively penetrate. Perhaps for this reason, the use of photopolymerizable compositions has been largely directed to forming thin films or coatings.

U.S. Pat. No. 5,340,653 to Noren et al. is one example of a free-radical curable composition used as a coating for various substrates.

One possible exception to the use of photopolymerizable compositions for thin films and coatings is U.S. Pat. No. 5,137,800 to Neckers et al. This Neckers et al. patent concerns forming three-dimensional objects by stereolithography using the general method described in U.S. Pat. No. 4,575,330 to Hull. As is disclosed in the '800 patent, a photopolymerizable monomer and a photoinitiator system for the monomer is used in a method that involves directing a ray of activating radiation for the photoinitiator system to and through a point in a given plane and into the body of the composition in which either the intensity of the activating radiation of the ray or the time during which the ray entering the body is directed through the point is employed to determine the distance through which the ray of activating radiation enters the body to the point of the succession of points to which the ray activates the photoinitiator system that is farthest from the surface.

More particularly, when the three-dimensional polymerizing method is practiced, using a visible light photoinitiator, such as eosin and its derivatives and visible light for activation, it is stated that it is not necessary that the photoinitiator have a peak absorbance at the wavelength of the activating light. All that is required is that there be sufficient absorbance at the wavelength of the activating light to cause the reactions which form the activator and cause the dye to lose its color at the required rates. As is noted, if bleaching occurs too rapidly, by comparison with the rate at which polymer-forming radical formation occurs, radical reactions which do not cause polymerization, e.g., radical coupling, can be expected. It is stated that, if polymerization occurs too rapidly, by comparison with the rate at which bleaching occurs, activating light cannot penetrate the monomer/photoinitiator mixture to a sufficient depth, and polymerization stops on or near the surface through the light enters. Referring to the foregoing working Examples in the '800 patent, Neckers et al. state that the balance was achieved by the selection of certain dyes as photoinitiators, using triethanolamine as an accelerator, and controlling the proportions of the two. In general, it is stated that the photoinitiators are used at extremely low concentrations by comparison with those which have previously been suggested and used, most frequently in curing thin films. On the other hand, it is noted that the concentration of the photoinitiator must be sufficiently high that the induction period is not excessive, and the concentration of the activator and the photon density must both be sufficiently high that the rates of bleaching and polymerization are appropriately matched to achieve polymerization to a desired depth in a photopolymerizable composition. (col. 22, 11. 19–58).

This Neckers et al. patent uses a highly focused light source. Thus, certain lasers were used in the methods disclosed in the working Examples. Also, in describing the reaction using a system including trimethylopropane triacrylate with eosin lactone and triethanolamine, and using a beam of visible light from an argon ion laser having a wavelength of 514 nm, Neckers et al. state that the eosin undergoes a reaction with the triethanolamine, producing two moieties, one of which is a free radical which serves as an activator for the polymerization of the trimethylopropane triacrylate. The loss of the dye color also occurs as a consequence of the eosin reaction with the triethanolamine, enabling subsequent radiation from the argon ion laser to penetrate farther into the composition and to cause reaction of eosin with triethanolamine and activation of the trimethylopropane triacrylate at the level of greater penetration, and still greater penetration by subsequent radiation with consequent reaction and activation at the level of the still greater penetration. (col. 2, 1. 58 to col. 3, 1. 7).

As may be appreciated, producing materials by stereolithography involves rastering a laser beam across the surface of a pool of monomer to form a thin polymeric layer. This polymerized layer is then lowered slightly into the pool of liquid monomer, and fresh monomer flows into its place at the free surface. A second thin layer of polymer is then formed at the free surface, and this second layer adheres to the layer below it. By repeating this process, it is possible to make thick polymeric parts. While stereolithography perhaps may be suitable for some applications such as developing a prototype, the slow process rates make stereolithography unsuitable for large-scale production of polymeric or composite parts.

Despite all of the considerable work in this field, there exists the need for a fabricating method for thick polymeric or composite parts and the like which is amenable to high speed, low cost production. To this end, a principal object of the present invention is to provide a composition suitable for making thick polymeric or composite parts that is amenable to high speed, low cost production and is energy efficient.

A further object of this invention is to provide polymeric or composite parts capable of being made from a variety of monomer/resin systems so as to allow tailoring of the properties to the particular requirements of the end use application.

A still further object is to provide a reactive composition for making thick composites which is characterized by a relatively long shelf life.

Yet another object of the present invention lies in the provision of a facile process which may be utilized to form thick parts by widely varying techniques.

A further object of this invention is to provide an improved process for forming composites utilizing RTM technology and achieving high speed, low cost production capabilities.

A still further object is to provide a method for making polymeric or composite parts which allows decoupling of the mold filling operation from the initiation of the reaction itself together with the attendant advantages thereby achieved. A more specific aspect thus provides an RTM process characterized by the ability to utilize low viscosity monomers, allowing rapid mold filling at low pressures, efficient penetration of the reactive liquid into the reinforcing material without displacement thereof, and the like.

Yet another more specific aspect lies in the elimination of gelation in the respective transfer lines used in a molding system so as to facilitate automation.

Other objects and advantages will become apparent as the following description proceeds.

SUMMARY OF THE INVENTION

In general, the present invention is predicated upon the discovery that thick polymeric or composite parts can be readily fabricated by utilizing a photopolymerizable composition including a photoinitiator exhibiting a selfeliminating absorbance characteristic. In this fashion, any undue light intensity gradient existing in the part being made can be adequately diminished, or even eliminated, so as to allow effective curing throughout the part thickness. The resulting polymeric or composite part will exhibit the strength and other characteristicsindicative of the type of polymer system being utilized. In other words, the strength and other physical characteristics that can be obtained using the present invention can certainly match those achieved using conventional thermal polymerization techniques.

The present invention is versatile, allowing use of many of the monomer systems conventionally used in forming composite parts, such as RTM and the like. Thus, the monomer systems often used in such RTM processes can be used advantageously in the present invention.

Still further, the present invention, in addition to decoupling the mold filling operation from the initiation of the reaction so as to provide the several substantial advantages resulting from such decoupling, provides a facile method with wide processing latitude. The present invention thus provides a method highly amenable to a relatively low cost mass production system. Since the present invention eliminates any need for high pressures or external heating of the mold or die, energy efficiency is provided.

As will be discussed in the description which follows, the present invention allows substantial advantages to be achieved in not only RTM process but in other techniques as well. These particular advantages will be more fully described hereinafter.

DETAILED DESCRIPTION OF THE INVENTION

Figure 1A:
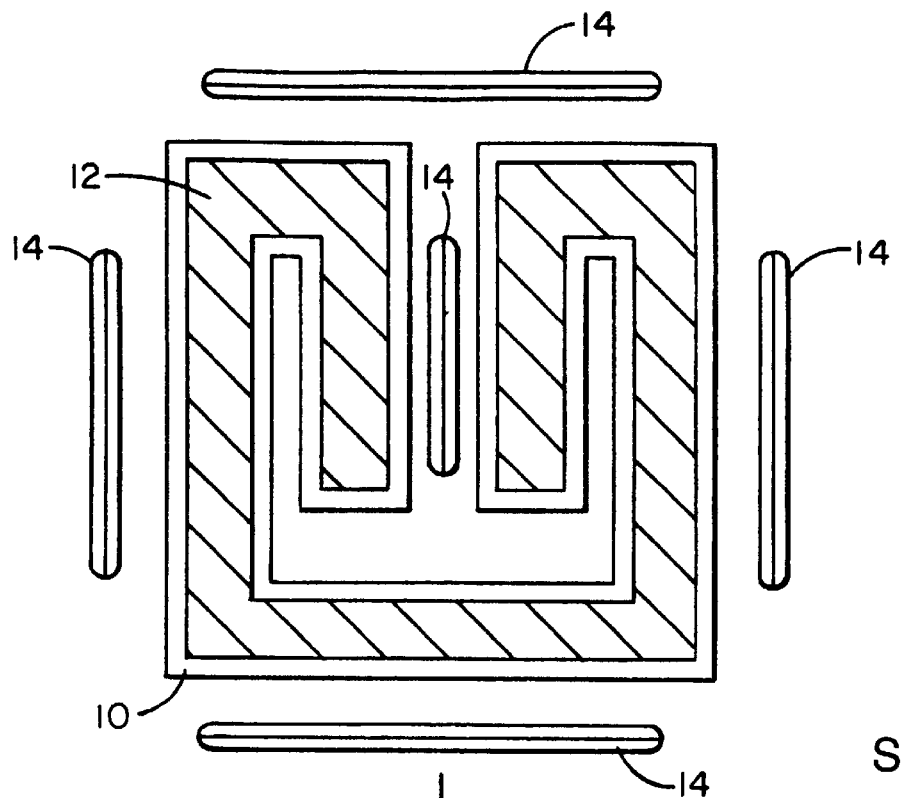
FIGS. 1A–E are a schematic illustrating a sequential illumination strategy by which the present invention may be utilized to form a part of complex shape with minimal residual stresses.

As may be appreciated, the relative percentage and the composition of each of the reinforcement material and the matrix material phase will depend upon factors such as the performance and other requirements of the specific end use application. In general, for applications requiring composites with relatively high mechanical properties, the reinforcing material may make up as much as about 60 or 70% or even more based upon the total weight of the composite. On the other hand, in applications where relatively high mechanical properties are unnecessary, the reinforcement material may comprise only about 5% to 10% based upon the total weight of the composite, perhaps even less. In addition, if the fiber or other reinforcement material is unnecessary or unwanted for a particular application, the invention may be used with neat systems containing no fiber.

As regards the materials used for reinforcement, a wide variety of such materials are known in the art and may be utilized. As representative examples of the type of reinforcement materials that are useful, representative useful materials include chopped E-glass fibers ranging from fine powders to long fibers.

Still further, in making composites by prior art techniques, useful types of reinforcement are often termed as chopped strands, chopped strand mats, woven roving (e.g., a coarse, heavy fabric made up of long, continuous glass fiber strands), biaxial mats, continuous strands and unidirectional mats. All of these types of reinforcement can be utilized in the present invention. In addition, fillers and viscosity-enhancers such as powdered silica, fumed silica, glass beads, and microspheres may be used with the present invention.

The thickness of the composite part which may be fashioned in the process of the present invention may be affected by the light scattering caused by the presence of the reinforcement material. Such an effect can be at least minimized, if not essentially eliminated, by utilizing reinforcing materials and monomers (as well as the resulting polymers in the particular system) that have refractive indices which are the same or at least quite similar to each other. Similarly, in those applications where this can be accomplished, orienting the reinforcement material, for example, fibers, in a direction generally parallel to that of the travel of the light, should also minimize the effects of light scattering.

As to the matrix or binder phase, any one of a wide variety of monomers capable of being polymerized via radical or cationic reactions may be used. As an illustrative example, one family of useful resins are the DERAKANE epoxy vinyl ester resins (Dow Chemical Co., Midland, Mich.). Such resins are presently commercially used to fabricate a wide range of corrosion-resistant composites by conventional fabricating techniques. Several resins in this family of varying viscosities have been utilized in the present invention and have performed satisfactorily. Specific illustrative examples of members of this product family which have been utilized include the following: 411c-50, 441-400 and 470-45. It is thus preferred to utilize such DERAKANE epoxy vinyl ester resins in the method and composites of the present invention.

However, and while less preferred, acrylates and other monomers may be used if desired for a particular application, either alone or with other resins such as the DERAKANE resins. Any of a wide variety of acrylates, as well as vinyl ethers, vinyl esters, and styrenics, are commercially available and may be used.

Indeed, the principal requirements for the monomers utilized to form the matrix material are that the monomer should not have unduly facile extractable hydrogens so as to adversely affect the photoinitiation sequence as will be discussed hereinafter. In addition, the monomer and the resulting polymer should have minimal or no absorbance in the wavelength range where photoinitiation is taking place.

In addition to the types of resins previously described, there are many monomers that are known which can satisfy these principal requirements; and these monomers can be used in the present invention. As may be appreciated, the utility of any monomer for use in this invention can be determined quite readily, i.e., by testing use in the contemplated system.

In accordance with one aspect of the present invention, a photoinitiator is utilized which possesses the requisite self-eliminating absorbance characteristic to make the particular composite part. Thus, it has been found that certain types of photoinitiators which are effective in the ultraviolet wavelength range exhibit an absorbance which rapidly decreases over a period of time so as to allow penetration of emitted light throughout a thickness of 1 to 2 centimeters or so.

The self-eliminating absorbance characteristic is thus defined as an ever-decreasing absorbance of initiating light over a period of minutes so that a part having a thickness of at least 0.1 centimeter can be cured in a few minutes or less while achieving a part having the principal physical performance characteristics essentially the same as obtained using the same resin and reinforcing material systems cured via thermal polymerization. More particularly, utilizing the method of the present invention allows preparation of composites which have physical characteristics such as tensile strength and other physical parameters that are equivalent to the physical characteristics which can be obtained with conventional fabricating techniques and will also satisfy the particular performance requirements for a wide variety of applications where thick composite parts are desired.

Useful photoinitiators include benzoin ethyl ether (BEE) and other benzoin ethers, such as, for example, benzoin methyl ether (BME) and benzoin phenyl ether (BPE). While the present invention should not be limited to this explanation, it is hypothesized that the selfelimination of the absorbance of benzoin ethers such as BEE is due to the creation of substantially more radicals via fragmentation than occurs through hydrogen abstraction upon excitation with ultraviolet light in the appropriate wavelength range (i.e. 320–360 nm). The resulting fragmented radicals which are produced are distinct from the original structure of the BEE and do not absorb in the 320–360 nm range in which BEE has substantial absorbance. Accordingly, as the BEE molecules are excited and fragment, the increase in the number of molecules which fragment results in a decreased absorbance in the 320–360 nm region. In this fashion, the ultraviolet light is allowed to penetrate deeper into the part being fabricated.

One representation as to the fragmentation which may occur upon photoexcitation is set forth below:

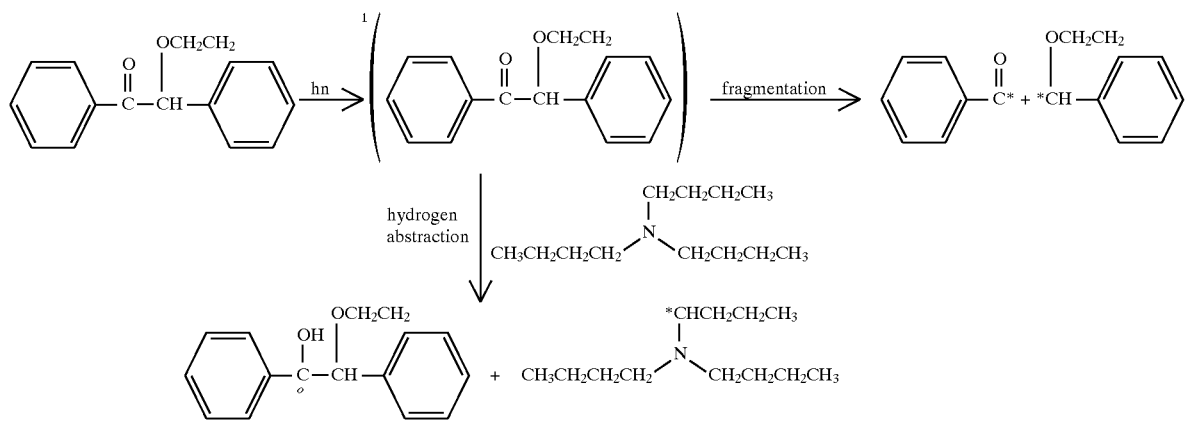

of course, under this hypothesis, any BEE molecule which produces radicals by hydrogen abstraction may continue to absorb strongly in the 320–360 nm range because the general structure of BEE is essentially maintained. It is believed that the ratio of fragmentation to hydrogen abstraction will depend strongly on the initiator, stability of the fragmented radicals formed, and the relative strength of the hydrogen donor. Additionally, and as has been previously discussed, by avoiding inclusion in the photopolymerizable system of a strong hydrogen donor (as well as avoiding the use of an accelerator, such as triethanolamine), the relative likelihood of hydrogen abstraction occurring during photopolymerization can be minimized.

In view of the photoinitiators which possess the desired characteristic and those (e.g., thiosalicyclic acid) which do not, one can make at least a preliminary prediction as to the suitability of a photoinitiator for use in the present invention, simply based upon the chemical structure of the respective photoinitiator, photosensitizer, or coinitiator. More specifically, the characteristic of a self-eliminating gradient is likely to be found in systems which contain initiators (photoinitiator, photosensitizer, or coinitiator) which have the following characteristics: the initiator system should consist of at least two aromatic rings which are either conjugated or otherwise coupled in such a manner that the resulting molecule has a considerable or continuous $\pi$-electronic structure. This excess of $\pi$-relectrons in the highly coupled aromatic structure enables the molecule to absorb light in the near ultraviolet region of the spectrum. Upon illumination, the excited state of this molecule should initiate either a free radical or an ionic polymerization reaction by electron transfer/photofragmentation. The resultant initiator molecule should lose its characteristic absorbance in the near-UV region of the spectrum due to the loss of the coupled aromatic $\pi$ structure. Therefore, this method would predict that benzoin ethers such as BEE or BME would produce gradients which would self-eliminate due to the loss of aromatic coupling caused by photofragmentation of the molecule. Further, if desired, chemical analysis can be carried out after photoexcitation to determine whether fragmentation has occurred.

However, and regardless of the mechanisms by which the requisite self-elimination of the absorbance occurs, suitability under the desired processing conditions can be determined in a straightforward fashion simply by carrying out the photopolymerization, and then determining the physical characteristics of the resulting composite part. The physical characteristics achieved should be of the same approximate level as those which can be obtained using thermal polymerization with conventional free radical catalysts.

In general, from a functional standpoint, the amount of the photoinitiator in the photopolymerizable system should be enough to achieve satisfactory photopolymerization in the time desired using the other desired process parameters. Additionally, the photoinitiator should not be present in such an excessive amount that it does not allow the absorbance of the photoinitiator to self-eliminate at a rate adequate to allow polymerization throughout the thickness of the part being fabricated.

With these criteria in mind, it will be suitable for most applications to utilize an amount of photoinitiator in the range of about 0.01 to about 4% based upon the total weight of photopolymerizable system. However, as may be appreciated, useful amounts can be determined in a straightforward fashion simply by carrying out the photopolymerization under the desired process parameters and then testing the resulting physical characteristics of the part.

As regards the light source, conventional sources of ultraviolet light and the like are well known and may be used. The present invention is highly versatile and does not require any special type of light source. All that is required is that the light source employed provide light in the wavelength range dictated by the particular photoinitiator used. While unnecessary, light in wavelengths outside the desired photopolymerization range for the particular photoinitiator could be filtered out. Still further, the light source employed can emit light to penetrate throughout one or more faces or sides of the composite part being fabricated. A high intensity point-focused light source such as a laser is not required and in many applications would not be useful.

Illustrative examples of useful light sources that can be desirably employed range from low-intensity light sources such as long wave UV lamps as produced by UVP (San Gabriel, Calif.), low intensity arc lamps as produced by Oriel (Stratford, Conn.), high intensity arc lamps (Oriel), lasers, and ultraviolet curing systems available from Fusion Systems Corporation (Rockville, Md.).

The rate of cure will be affected by a variety of parameters, perhaps most significantly by the intensity of the initiating light and the photoinitiator concentration. It has thus been found that increasing the intensity of the initiating light decreases the cure time required. Similarly, increases in the photoinitiator concentration may also decrease the cure time, keeping in mind the upper useful limits of the photoinitiator as have been previously discussed.

The procedure for forming the composite part is quite straightforward. All that is required is a mold for the desired composite having at least one face or side transparent to the initiating light so that the light can penetrate adequately to allow the photopolymerization to take place, a suitable light source, and the desired photopolymerizable composition itself in an amount adequate to fill the mold. The particular sequence of the procedure actually used can vary as desired. For example, inasmuch as the present invention decouples the mold filling operation from the reaction itself, the mold can be filled either before or after the light source being used is turned on.

Nevertheless, as an illustrative example of a particular procedure which may be advantageously used, parts in accordance with this invention can be made in the following manner: (1) if desired to shield the photopolymerizable composition from the thermal effects caused by infrared (IR) light, a filter can be placed in the path of the light source being utilized to protect the composition and/or the mold from direct heat caused by IR light, (2) if it is desired to eliminate any premature initiation of the photopolymerization, a shutter or the like can be placed in the path of the light emitted from the light source, (3) the light source can be turned on or otherwise activated, desirably allowing ample time for the intensity of the light being emitted to reach equilibrium, (4) a mold of a suitable dimension for the composite part can be provided with at least one or more path or paths for the light to transmit through to achieve the desired photopolymerization, (5) if desired, the mold can be coated with a mold release agent or agents so as to promote facile removal of the cured composite from the mold (any mold release agent from among the many known can be used), (6) the reinforcing material can be placed in the mold in the desired location, whether preformed or not (or, if desired, the resin and the reinforcing phases can be mixed together to provide a slurry), (7) the mold can then be filled with either the neat resin or with the slurry, (8) the shutter or the like can be opened or removed to allow the light to illuminate the resin phase; and, after allowing adequate time for the composite to cure, the shutter or the like can be closed so as to cut off the light source from the cured composite, and (9) the cured composite can be removed from the mold.

If desired, a post-curing operation can be carried out on the thus-produced composite part. A wide variety of post-curing methods are known (e.g., thermal curing as in an oven) and may be utilized.

It has been found that the position of the light relative to the composite part being fabricated can be varied as desired without significantly affecting the procedure. Accordingly, if desired, either multiple light sources can be used to accelerate the time required for the part to be satisfactorily cured, or light deflectors or other means can be used to allow the light to penetrate the mold from more than one direction.

Still further, and in accordance with one aspect of the present invention, because the positioning of the light source relative to the mold can be varied within wide limits, and the mold filling operation is decoupled from initiation of the reaction, it now becomes possible to effectively carry out a sequential fabrication. As one example, it is possible that, depending upon the configuration of a composite part, stresses and the like can be induced in the resulting part as a thermally cured part shrinks due to polymerization or due to cooling to ambient conditions.

Figure 1B:
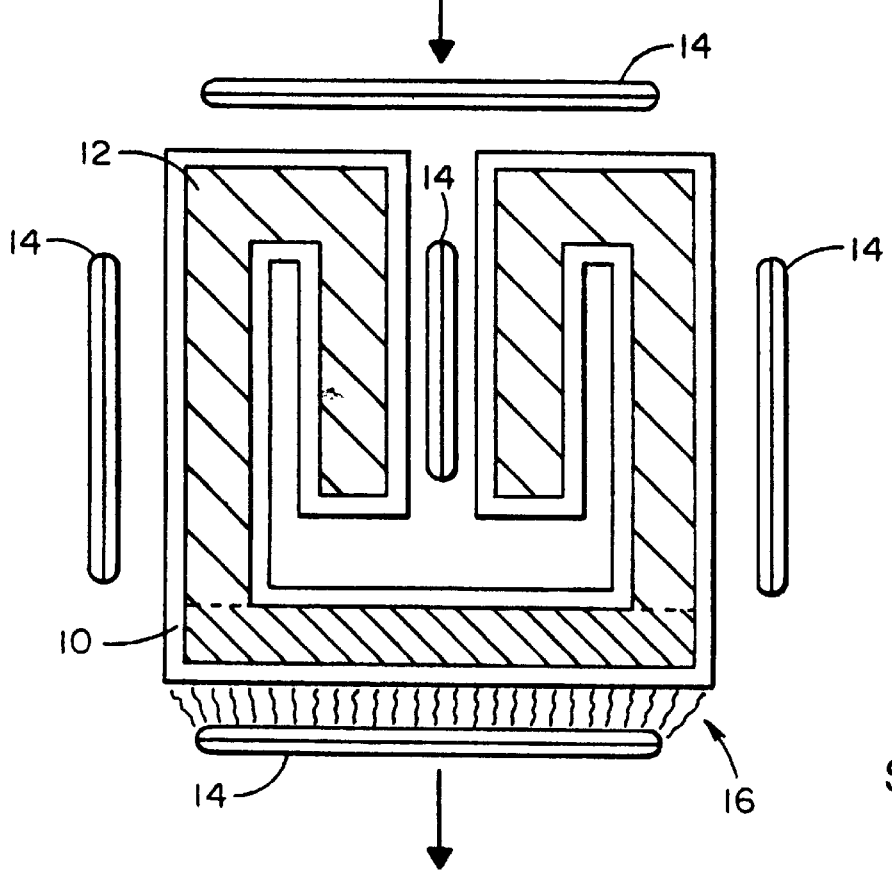
Figure 1C:
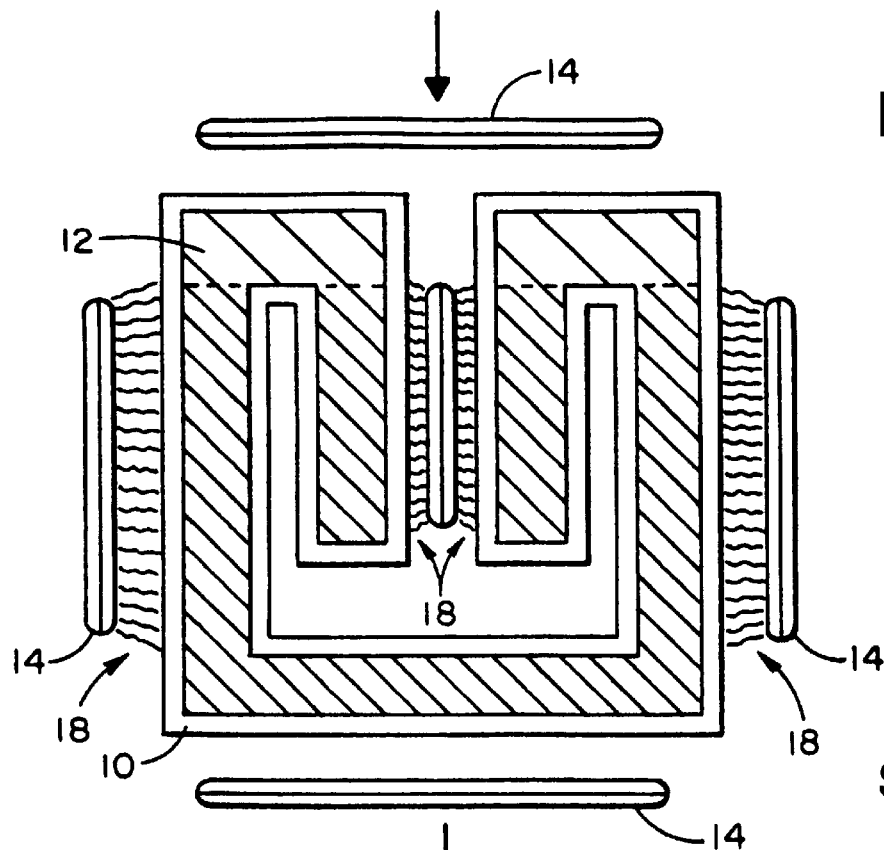
Figure 1D:
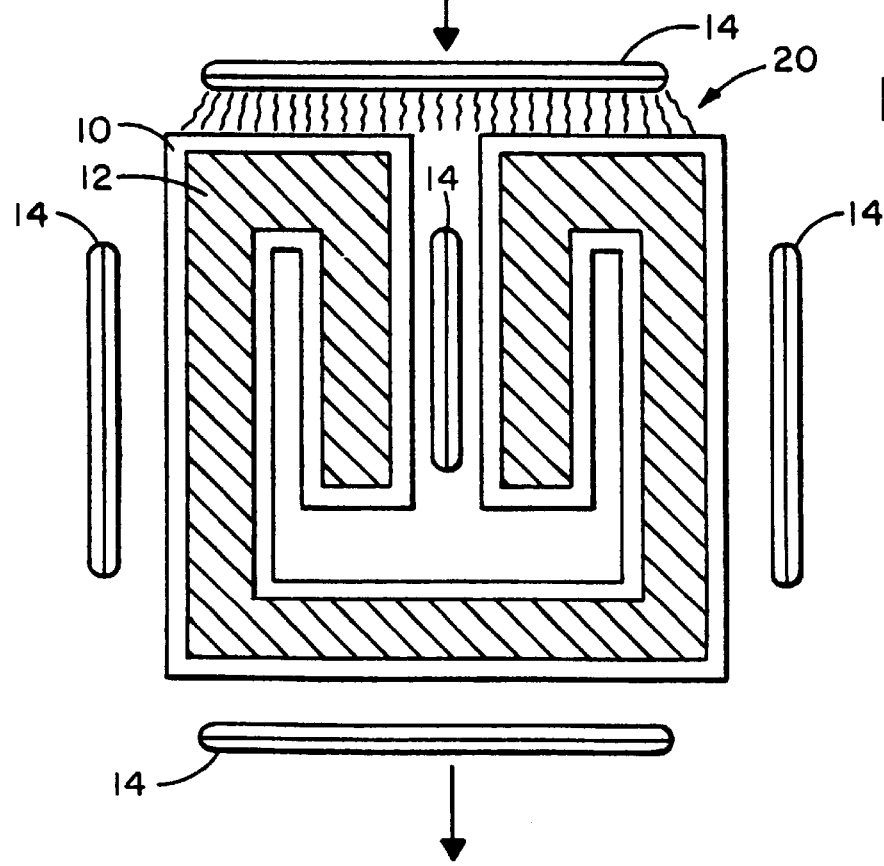
Figure 1E:
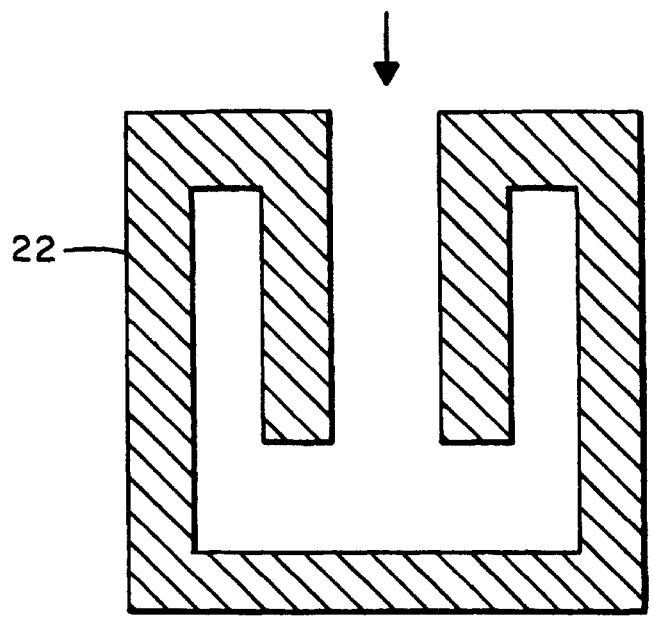

On the other hand, by utilizing the present invention, a sequential reaction can be initiated so that any stresses due to polymerization shrinkage and the like can be reduced or eliminated. This is further illustrated in FIG. 1A wherein the polymerization at different locations in the mold is initiated sequentially in a predetermined manner such that the unreacted resin near the polymerization front is allowed to flow, thereby relieving any stresses. More particularly, in Step 1 (FIG. 1B), (FIG. 1A) transparent mold 10 is shown filled with an uncured photopolymerizable resin 12. Also, irradiating sources 14 are positioned about mold 10. In Step 2 (FIG. 1B), the bottom 16 of the part being fabricated is first cured, and then the sides 18 (Step 3, FIG. 1C) and the top 20 (Step 4 FIG. 1D) of the part are cured. Step 5 (FIG. 1E) shows the demolded part 22. As may be appreciated, sequential reaction may be achieved by any of a number of illumination strategies which may involve relative motion between the light source and the mold, or sequential illumination of a number of strategically located light sources.

Indeed, when using the present invention with a light source operable in the ultraviolet wavelength range, there should generally be no requirement to utilize any shielding or the like of the mold or photopolymerizable composition from ambient light conditions. This is a further advantage derived from using the present invention which may be of significance in some situations. This advantage enhances the extreme versatility and relative ease with which the present invention can be utilized.

An additional class of optional additives which can be included in the photopolymerizable compositions of the present invention are thermal initiators, such as the peroxides (e.g., benzoyl peroxide), useful nitriles (e.g., azoisobutyronitrile), and other commercially available thermal initiators such as Wako VA-70 (2,2-azobis[2-(2-imidavolan-2-yl-)propane]dihydrochloride and VA-044 (2,2'-azobis(4-methoxy-2,4-dimethylvaleronitrile). There are several types of situations in which thermal initiators might be advantageously included. For example, where the composite part includes recessed portions that may not receive light directly or in situations where higher than ambient temperatures are utilized for lowering the viscosity of the particular monomer system or simply to reduce somewhat the curing time necessary, the use of thermal initiators may be helpful. The particular amount employed will typically be less than that used when the polymerization itself is achieved solely thermally. While the particular amount useful can be determined experimentally in a straightforward fashion, a useful level will typically be in the range of 0 to 5 weight percent based on the total weight of the photopolymerizable system. In addition, useful thermal initiators cannot absorb appreciably at the initiating wavelength for the photopolymerization.

As has been previously alluded to, there may be situations in which it is desired to carry out the polymerization at a temperature other than ambient conditions. A useful temperature range may vary from 20° C. up to 100° C. or perhaps higher.

Still further, while the present invention has been described with monomers which are polymerized via free radical polymerization, it should be appreciated that monomers can likewise be used which are polymerized cationically, if that is desired. Useful monomers which can be cationically polymerized include epoxides, vinyl ethers, styrenics, and propenyl ethers. When the photopolymerizable source utilizes monomers of this type, an illustrative coinitiator system that may be used for the photocure comprises an onium salt/anthracene system. A variety of onium salts are known to be useful as photoinitiators and may be employed herein. An illustrative example is UV9310 (GE Silicones, Pittsfield, Mass.). Similarly, many anthracene derivatives known as photosensitizers, but more appropriately termed a coinitiator herein, may be used. For example, 9-phenylanthracene may be employed. Also, suitable anthracene derivatives have been previously discussed herein. Effective amounts for the coinitiator systems may be determined experimentally in a straightforward fashion. A useful range may be from about 0 to perhaps 4 percent, based on the weight of the photopolymerizable system.

While not limited to this explanation, it is hypothesized that anthracene in a coinitiated cationic photopolymerization reaction will proceed as follows:

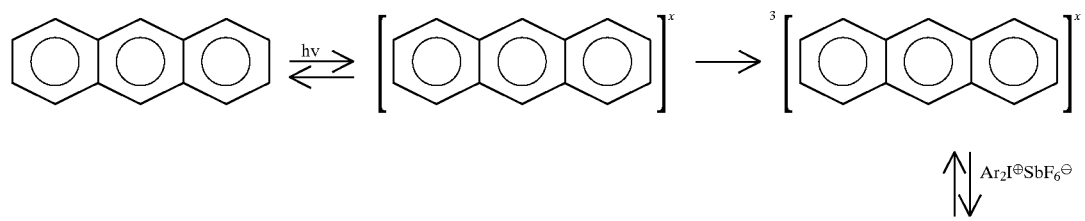

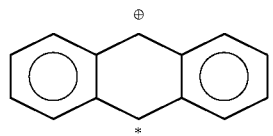 SbF$_6^\ominus$ + Ar$_2$I ⟵ 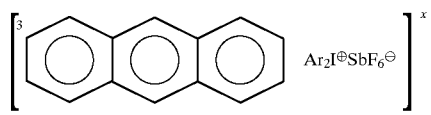

The result is that the absorbance decays over time as detailed in Example 15 which follows.

For most applications, as previously discussed, the thickness of the composite parts will fall in the range of about 0.1 centimeter up to two centimeters or somewhat more. The present invention is highly useful for forming polymeric or composite parts in this thickness range; and, indeed, while introducing some complications that may make it desirable to use multiple light sources and the like, as well as considerably longer reaction times, the present invention is likewise amenable to forming composite parts that are much thicker than the 1–2 centimeter range.

It should be appreciated that the present invention may be utilized to form any shape or part for any application. All that thus is intended by a "part" is a three-dimensional shape configured for the intended application. Examples of general applications have been previously listed by way of background.

Still further, while the present invention is highly advantageous for forming composite parts using RTM techniques, it should be appreciated that other types of molding techniques could be used. For example, rotational molding techniques have been employed for many applications; and the present invention can be used to form parts using these techniques.

Still further, while the present invention offers substantial advantages for forming composites, it should be appreciated that advantages are likewise derived when forming either relatively thin parts or parts which do not require a reinforcement material phase. Indeed, the present invention may be used in any application where photopolymerization would be useful or where advantages are derived because the initiation of the polymerization reaction is decoupled from the filling of the mold or where use is desired due to any of the many other advantages that may be achieved by utilizing the present invention.

Thus, as one illustrative example of such a situation, many parts of relatively complex shapes are made in a sequential fashion. Potting compounds are often required to temporarily bond intermediate parts to one another or to secure these intermediates so that they can be shaped, molded, or allowed to cure in complex geometries. Potting compounds for this type of application must cure at relatively rapid rates once they have been applied, they must exhibit adequate mechanical properties and good adhesion to a number of substrates, and they must be of a putty-like consistency so that they do not flow before or during cure when applied to a part.

In addition to this application, potting compounds may also be used as permanent bonding agents or as a repair material in a variety of instances ranging from the transportation industry (automotive, marine, and aerospace) to home improvements (drywall repair). In accordance with one aspect of the present invention, a useful photopolymerizable potting compound can be made as follows: a viscosity enhancer or filler is added to a reactive resin (e.g., a monomer or oligomer such as "DERAKANE" epoxy vinyl ester resin comprising, for example, about 99.8% of the resin by weight with the balance being a photoinitiator such as BEE) until it comprises 15–30% of the system by weight or higher depending on the application. The resulting compound can then be stored and used when necessary. An advantage of such a system is that any unused portion of the potting compound may be collected and stored for future use.

Suitable fillers that may be used include, but are not limited to, fumed silica, silica gels, Solka Flok, and low molecular-weight polystyrene. Additionally, a partially-cured, photopolymerizable resin may be used without filler, in which case the putty-like properties are achieved via the partial cure.

The following Examples are illustrative, but not in limitation of, the present invention. Unless otherwise indicated, the light source used was a 100-watt, long-range ultraviolet (UV) lamp as produced by UVP (San Gabriel, Calif.). In the Examples, the following were carried out as indicated:

Mechanical Properties

Mechanical properties of various polymeric and composite specimens were measured using a United STM-20 instrument in a manner similar to the ASTM D 790 method. All mechanical properties were measured by the three point flexural strength test, using 50.8 mm (2 inch) long specimen samples with a length to thickness ratio of approximately 16. A 1000 lb. load cell was used with a downdrive rate of 0.05 inches/min. The flexural modulus was calculated for these samples at elongations between 0.05% to 0.25% of an inch.

Absorbance

Spectraphotometric experiments were conducted using a Hewlett-Packard UV-Visible Spectrometer model 8452A. The absorbance of the various initiators and resins were obtained from dilute solutions of these compounds in 1-propanol. Absorbance decay experiments of 0.1 wt % BEE in 1-propanol were conducted as follows: the solution was irradiated with UV light for a predetermined time interval then removed from the light and placed in the spectrometer, where its absorbance was collected and recorded. This process was repeated until absorbance at 328 nm was insignificant.

EXAMPLE 1

This Example illustrates the self-eliminating absorbance characteristic of a photoinitiator used in the present invention.

BEE was added to 1-propanol in an amount such that the weight ratio of the BEE solute to the 1-propanol solvent was 0.1 to 99.9. Three grams of the thus-formed solution were placed in a 1 cm. ×1 cm. ×3 cm. quartz cuvette, and the absorption of the solution was measured. The solution was exposed to a UV light source for a period of minutes, and the absorbance was measured as before.

Figure 2:
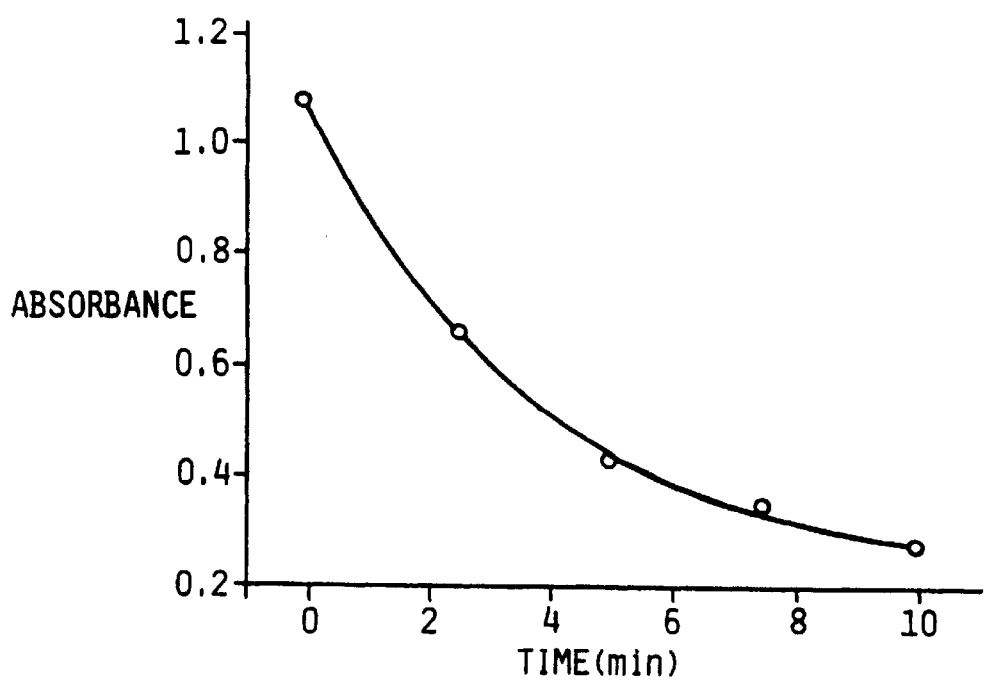
FIG. 2 is a plot of the light absorbance at 328 nm as a function of time for 0.1 wt. % benzoin ethyl ether in n-propanol illustrating the decay characteristic of a photoinitiator exhibiting self-eliminating absorbance.

The data obtained was plotted, and FIG. 2 shows the absorbance versus time. As can be seen, exposure to the UV light caused the absorbance of BEE to decay exponentially, with the time constant for this decay being 3.63741 minutes.

EXAMPLE 2

This Example compares certain physical properties of the photopolymerized parts made pursuant to this invention to such properties obtained when the same resin is thermally cured.

Two glass rods plugged at one end by rubber stoppers were filled with a reactive resin from a bulk mixture of 99.90 wt. % DERAKANE 411C-50 and 0.1 wt. % BEE (Samples 1 and 2). Photopolymerization was carried out in a time period of five minutes by projecting light from a 1000-watt Hg (Xe) UV light source onto the sample.

For purposes of comparison, two glass rods were filled with 99.90 wt. % DERAKANE 411c-50 and 0.1 wt. % 2,2'-azobisisobutyronitrile thermal initiator and then stoppered with rubber stoppers (Samples 3 and 4). Samples 3 and 4 were then thermally cured for 24 hours in an oven maintained at 70° C. Each of the four glass rods had an inside diameter of 0.22 inches.

Upon completion of the respective cure, each of the four samples were allowed to cool until they were cool enough to handle by hand. The cured resins were then removed from the glass rods by cracking the glass. The mechanical properties of the cured polymers were tested. The appearance, texture and strength of both thermally-and photo-cured polymers were similar. The flexural modulus of these samples are shown in Table 1 below:

TABLE 1

| Cure Method | Flex Modulus (kpsi) |
| --- | --- |
| Sample 1 - photocure | 461.61 |
| Sample 2 - photocure | 448.21 |
| Sample 3 - thermal | 429.83 |
| Sample 4 - thermal | 447.70 |

As can be seen, the photocured parts exhibit modulus properties similar to their thermally cured counterparts.

EXAMPLE 3

This Example illustrates the use of various reinforcement materials to make composite parts in accordance with this invention.

Similar to the procedure described in Example 2, glass rods were filled with 99.90 wt. % of a lower viscosity resin, i.e., DERAKANE 470-45 resin or DERAKANE 411c-50 and 0.1 wt. % BEE. Photocure was then effected using the light sources and procedure described in Example 3 although the curing times varied.

Table 2, below, sets forth the type of reinforcement material, the curing times and the modulus properties of the photocured parts:

TABLE 2

| Sample No. | Reinforcement Material | Wt. % of Reinforcement Material | Cure Time (Sec.) | Flex Modulus (GPa) |
| --- | --- | --- | --- | --- |
| 5 | Random Material | 30 | 300 | 15.2 |
| 6 | 1 mm glass beads | 60 | 318 | 3.0 |
| 7 | Short fibers | 45 | 420 | 9.7 |

As can be seen, various reinforcement materials can be utilized to provide satisfactory modulus characteristics of the resulting composite.

EXAMPLE 4

This Example illustrates the importance of photoinitation versus thermal initiation for the types of reactive formulations disclosed herein.

Figure 3:
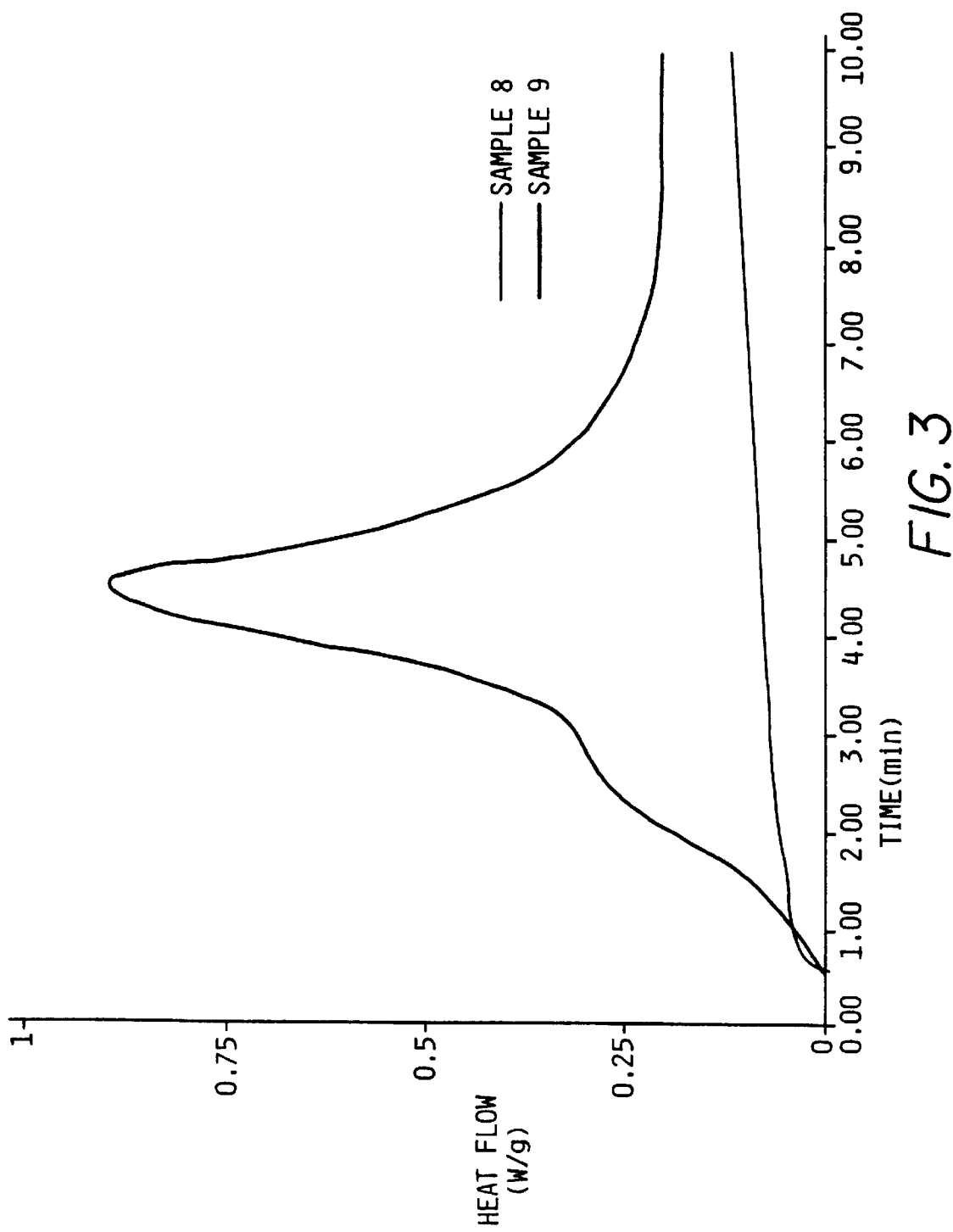
FIG. 3 is a graph of heat flow versus time during a photopolymerization reaction of DERAKANE 470-45 containing 0.2 weight % BEE photoinitiator, illustrating that the initiator is thermally stable and produces initiating species upon exposure to appropriate light.

Samples containing 99.8 wt. % DERAKANE 470-45 and 0.2 wt. % benzoin methyl ether (BME) were placed in a differential scanning calorimeter (PDSC) modified to allow the samples to be photoinitated as well as thermally initiated. Sample 8 was placed in the PDSC and both the sample and reference pans were covered using two glass slides, each approximately 1 mm thick, to maintain the isothermal environment. The sample was preheated to 60° C. at a rate of 200° C./min, then maintained isothermally at 60° C. for 20 minutes. The heat flow versus time data was collected and recorded using a computer. Sample 9 was subjected to the same conditions except for the addition of a light source (intensity measured at 1 $\mu W/cm^2$) throughout the isothermal heating period. FIG. 3 shows the resulting plot of heat flow versus time for the respective samples. The increases in heat flow correspond to the polymerization reaction.

As expected, Sample 9 polymerized within 5 minutes and formed a hard, clear polymer, while Sample 8 failed to polymerize over the length of the experiment (20 minutes) and remained a liquid. Similarly, samples containing these photoinitiators failed to polymerize when maintained at 60° C. for 24 hours in the absence of UV light.

This Example demonstrates that these initiators are thermally stable and produce initiating species upon exposure to appropriate light.

EXAMPLE 5

This Example shows the effect of preheating on the curing time.

A series of three samples, each weighing about 20 mg., were prepared from a bulk solution containing 99.90 wt. % DELRAKANE 470-45 and 0.10 wt. % BEE. Each sample was placed in an aluminum pan and then placed in the sample chamber of a Perkin Elmer Differential Scanning Calorimeter (DSC) (DSC 7). Both the sample and reference chambers were covered with a rectangular glass slide (about 1 mm. thick) to allow light from a 200-watt Hg (Xe) arc lamp to be projected down 6 cm. onto each sample.

The samples were preheated as follows: Sample 10, 70° C.; Sample 11, 90° C.; and Sample 12, 110° C. The plots of heat flow versus time are shown in FIG. 4.

Figure 4:
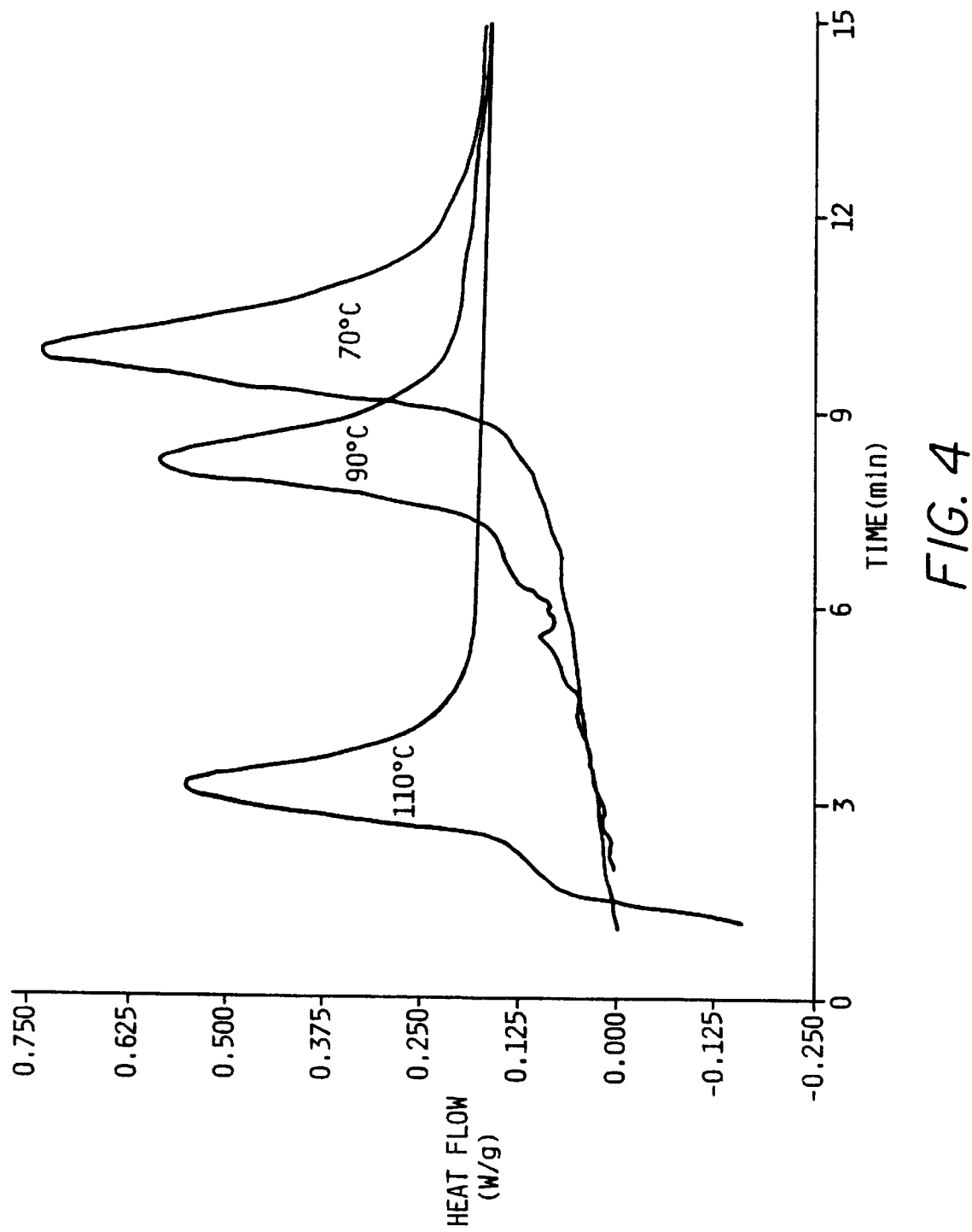
FIG. 4 is a graph of heat flow versus time during photopolymerization reactions of DERAKANE 470-45 containing 0.1 wt % BEE photoinitiator, which illustrates the effect of temperature on the cure time for samples reacted under isothermal conditions.

As shown in FIG. 4, curing may be accelerated by preheating the photoreactive resin.

EXAMPLE 6

This Example illustrates the use of the present invention to make a composite part using rotational molding.

A solution containing 99.90 wt. % DERAKANE 470-45 and 0.10 wt. % BEE was mixed in a glass test tube (1.78 cm. outside diameter) with e-glass fibers chopped into a fine powder, the fibers comprising 58.8 wt. % of a 14.1 gm. sample (Sample 13). The test tube was placed on an automatic mixer to create a resin slurry, and the test tube was then clamped to a spindle attached to a ½ horsepower motor.

The middle of the test tube was placed in the center of a three-pronged clamp in order to maintain a relatively uniform axis for rotation. The bottom of the test tube, containing Sample 13, was placed in the path of the 1000-watt light source described previously; and the test tube was rotated at a relatively moderate rate (estimated to be between about 100–200 rpm) for 4 minutes.

This Example is considered to demonstrate that the present invention can be used in rotational molding techniques.

EXAMPLE 7

This Example illustrates that the present invention can be utilized to make different geometric shapes.

Three samples (Samples 14–16) were made using the procedure and apparatus described in Example 6. The cure times used and the weight percent were varied as set forth in Table 3:

TABLE 3

| Sample No. | Cure Time (min.) | Fiber (wt. %) | Shape of Composite |
|---|---|---|---|
| 14 | 3.25 | 44 | pipe[1/] |
| 15 | 3.25 | 33 | interior threaded cylinder[2/] |
| 16 | 3.75 | 44 | exterior threaded cylinder[3/] |

[1/]The pipe had inside and outside diameters of about 5/16" and 5/8", and the hollow structure was obtained by photopolymerizing the mixture between two concentric glass tubes.
[2/]The interior threads were obtained by polymerizing the resin around a screw (8 diameter × 1½") placed in the center of the mold.
[3/]The exterior threads were made by photopolymerizing the slurry between two concentric glass cylinders. The inner cylinder was smooth and the outer cylinder had screw threads on its interior surface. The resulting part had an ID of 1" and an OD of 1 3/16".

The resulting composites demonstrate that the present invention can be utilized to make composites of varying shapes.

EXAMPLE 8

This Example illustrates the effects of cure time and degree of reinforcement material loading on the modulus of the resulting composites.

Individual samples were prepared from a bulk solution containing 0.06 wt. % BEE, 0.06 wt. % benzoin methyl ether (BME), and 99.88 wt. % DERAKANE 470-45 reactive resin. Four-inch glass tubes with an inside diameter of 0.25 inch were coated with a mold release agent (Carnuba Wax), filled with a slurry containing the reactive resin, BEE and BME, and e-glass fibers chopped into a fine powder and then stoppered at one end. The samples were then placed vertically in the path of light from a 1000-watt Hg (Xe) arc lamp at a distance of six inches and photocured for a measured length of time.

The exposure time to the light source was varied from three to ten minutes while the degree of reinforcement material loading was varied from 0 to 25 and 50 wt. %. Table 4 sets forth the results:

TABLE 4

| Sample No. | Exposure Time (min) | Wt. % Reinforcement Material | Flex Modulus (kpsi) |
|---|---|---|---|
| 17 | 3 | 0 | 434 |
| 18 | 3 | 25 | 759 |
| 19 | 3 | 50 | 1096 |
| 20 | 5 | 0 | 522 |
| 21 | 5 | 25 | 840 |
| 22 | 5 | 50 | 1397 |
| 23 | 7 | 0 | 540 |
| 24 | 7 | 25 | 901 |
| 25 | 7 | 50 | 1554 |
| 26 | 10 | 0 | 503 |
| 27 | 10 | 25 | 914 |
| 28 | 10 | 50 | 1388 |

As can be seen in Table 4, the modulus increased generally proportional to the degree of reinforcement material loading. Additionally, some improvement in modulus resulted with increasing cure time up to a point. More particularly, it appears that the cure time can reach a point where the modulus is no longer enhanced and may even be diminished.

EXAMPLE 9

This Example demonstrates the effect of initiator concentration on the modulus of the photocured polymers.

The procedure employed in Example 8 was used, except that BEE was the only photoinitiator, the remainder being the DERAKANE 470-45 reactive resin, and the cure time used was five minutes. Also, no reinforcement material was included.

Figure 5:
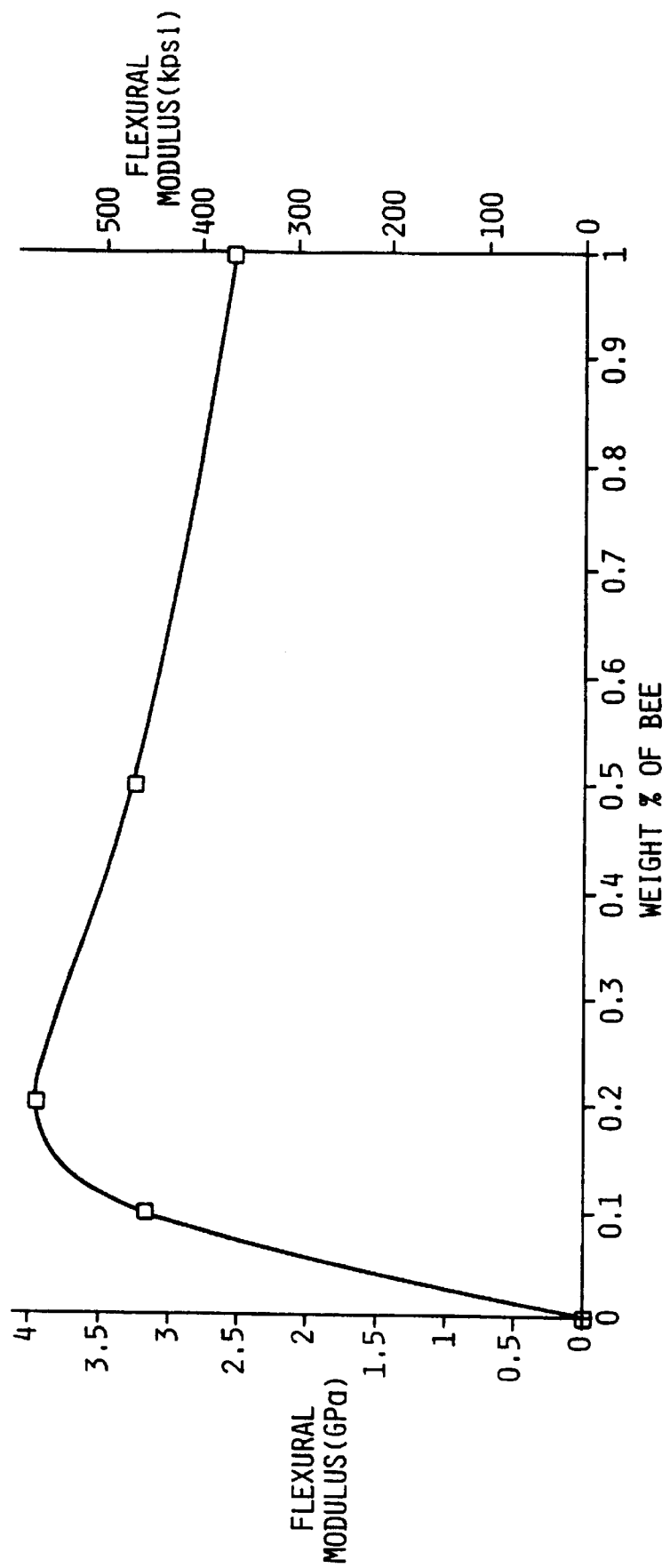
FIG. 5 is a graph showing the effect of initiator (BEE) concentration on the flexural modulus of polymers obtained by photocuring DERAKANE 470-45 for five minutes with an initiating light intensity of between 1.1 and 1.3 $\mu W/cm^2$.

Table 5 sets forth the results which are likewise plotted in FIG. 5:

TABLE 5

| Sample No. | Wt. % Initiator | Flex Modulus (kpsi) |
|---|---|---|
| 29 | 0.1 | 459 |
| 30 | 0.2 | 568 |
| 31 | 0.5 | 473 |
| 32 | 1.0 | 367 |
| 33 | 2.0 | — |
| 34 | 4.0 | — |

The results indicate that an increased level of photoinitiator can increase the modulus up to a point, perhaps the level needed to insure a complete propagation of the photopolymerization. Thereafter, the modulus can decrease with increasing photoinitiator concentration which may be the result of a decrease in the self-elimination of the absorbance of the photoinitiator, the resulting decrease in the molecular weight of the polymer, or both. For example, Sample 33 and Sample 34 did not completely polymerize under the conditions set forth in this Example, and therefore the flexural modulus for these samples could not be obtained.

EXAMPLE 10

This Example illustrates the effects of photoinitiator concentration on the thickness of a solid part that can be obtained with a fixed cure time.

Individual samples were prepared from DERAKANE 470-45 resin and varying concentrations of BEE photoinitiator (the amount of photoinitiator, by weight, was varied from 0.05% to 2.0%). Each sample was placed in a test tube having about a 15 mm inside diameter. The outside of the test tube was opaque, therefore cure was affected from only the top of the sample being exposed to the 1000 watt arc lamp previously described.

Figure 6:
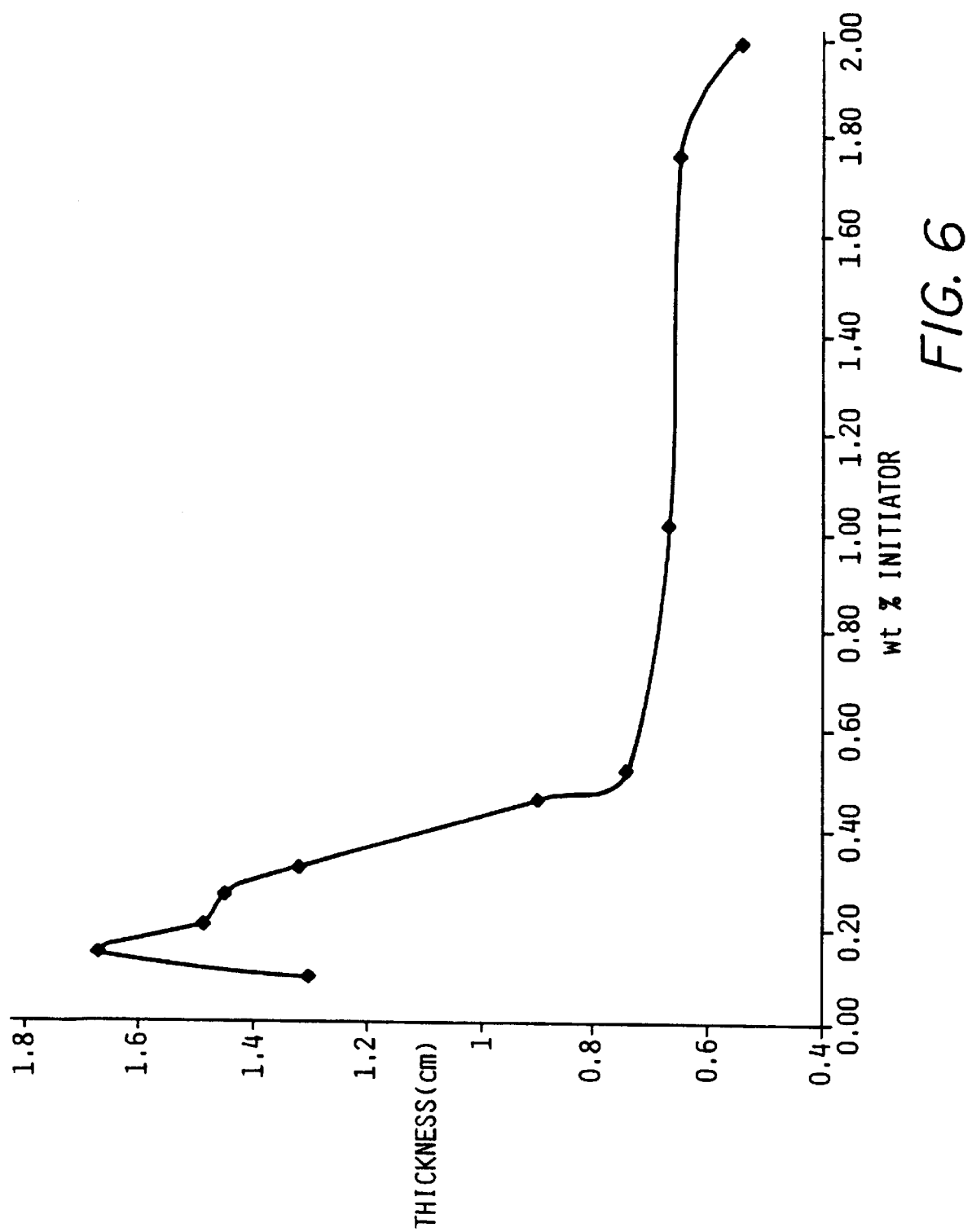
FIG. 6 is a graph of polymer thickness versus initiator concentration for DERAKANE 470-45 samples cured for 4 minutes at an initiating light intensity of 1.05 $\mu W/cm^2$.

Each sample was cured for four minutes, and the thickness in centimeters (measured from the top of the sample) of the solid, cured part was measured using calipers to determine the relative effectiveness of the cure. The thickness of the solid, cured part versus photoinitiator concentration was graphed, and the results are shown in FIG. 6.

As can be seen, the thickness of the solid part that can be obtained using the subject process parameters first increases at relatively low photoinitiator concentrations (i.e., 0.05 to 0.2 wt. %), and then decreases as the photoinitiator concentration is further increased.

EXAMPLE 11

This Example illustrates the effect of varying the intensity of the ultraviolet light source upon the thickness of the solid, cured part that could be obtained using two different photoinitiators.

Two series of samples were prepared, each containing DERAKANE 470-45 and 2.0% by weight of two different photoinitiators. One series included BEE, and the other used "IRGACURE 651" photoinitiator (α, α-dimethoxy-α-phenylacetophenone from Ciba-Geigy, Hawthorne, N.Y.). The 1000-watt UV lamp previously described was used to cure each sample which had been placed in a test tube (a cylindrical glass vial, 1 cm ID). A cure time of four minutes was used, and the intensity was adjusted over the range indicated in FIG. 7.

Figure 7:
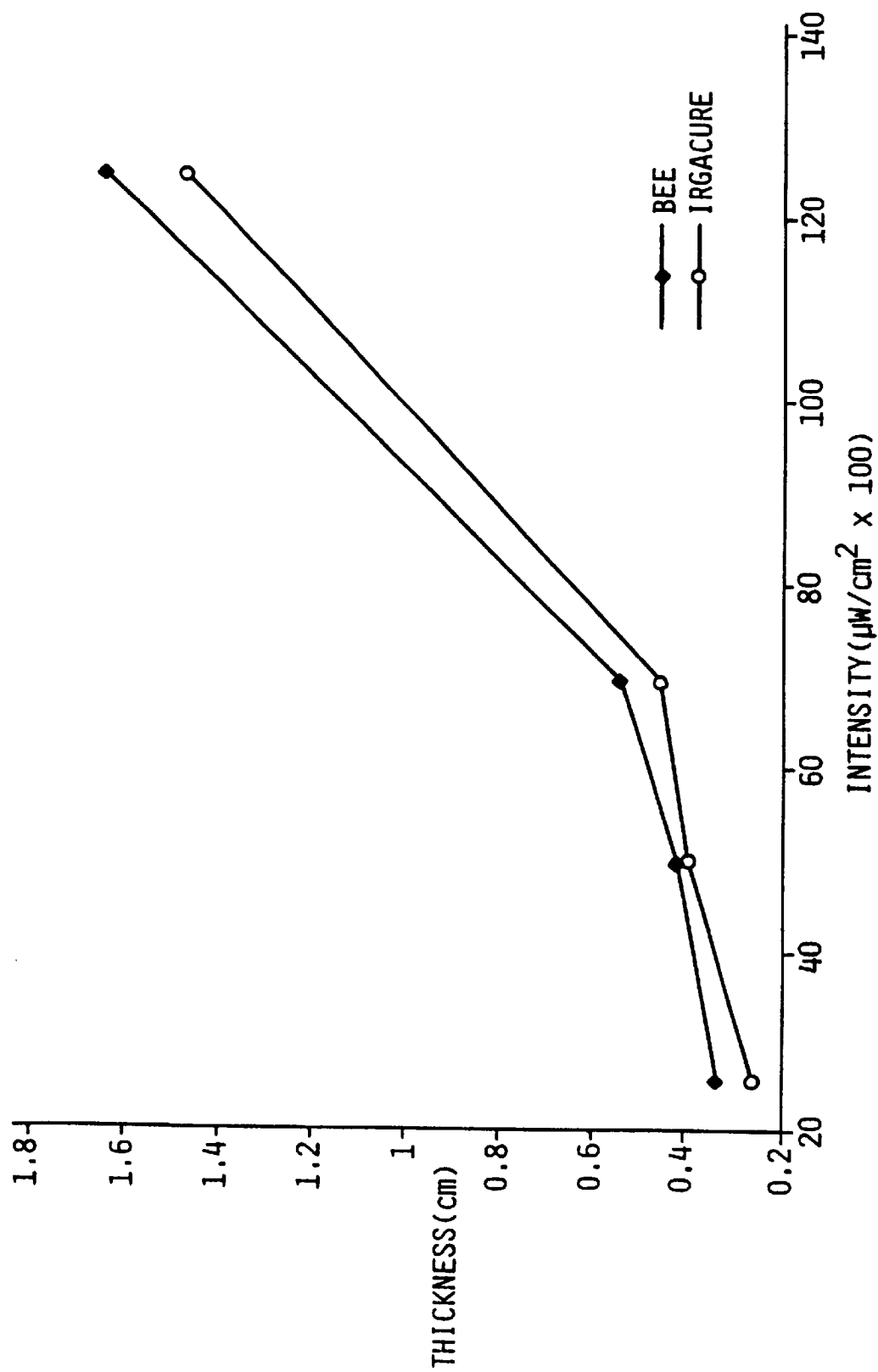
FIG. 7 is a plot of polymerization thickness versus initiating light intensity for 0.1 wt. % initiator which illustrates the relationship between the initiating light intensity and the thickness of the resultant polymer for two different photoinitiators which self-eliminate.

The thickness of the solid, cured part in each sample was measured as described in Example 10. The results are shown in FIG. 7.

These results illustrate that, within limits, the thickness of the part being formed can be increased as the intensity of the light source is increased.

EXAMPLE 12

This Example illustrates the effect on the modulus of the cured composite for varying levels of reinforcement materials as the cure time is varied.

Various samples were made using 99.88% DERAKANE 470-45 and 0.06% BEE and 0.06% BME with a reinforcement material (i.e., finely chopped e-glass fibers) at levels of 0, 25, 50 and 60%.

The samples made were 8 mm (¼ inch) thick, and a light intensity of 4.4 $\mu W/cm^2$ was used. A slurry consisting of the desired fiber loading, resin and initiator was poured into a mold coated with a release agent (silicone spray) and exposed to the initiating light for a predetermined period of time. Subsequently, the sample was then removed from the light and allowed to cool to room temperature by natural convection. The sample was then removed from the mold, and its flexural properties were tested.

Figure 8:
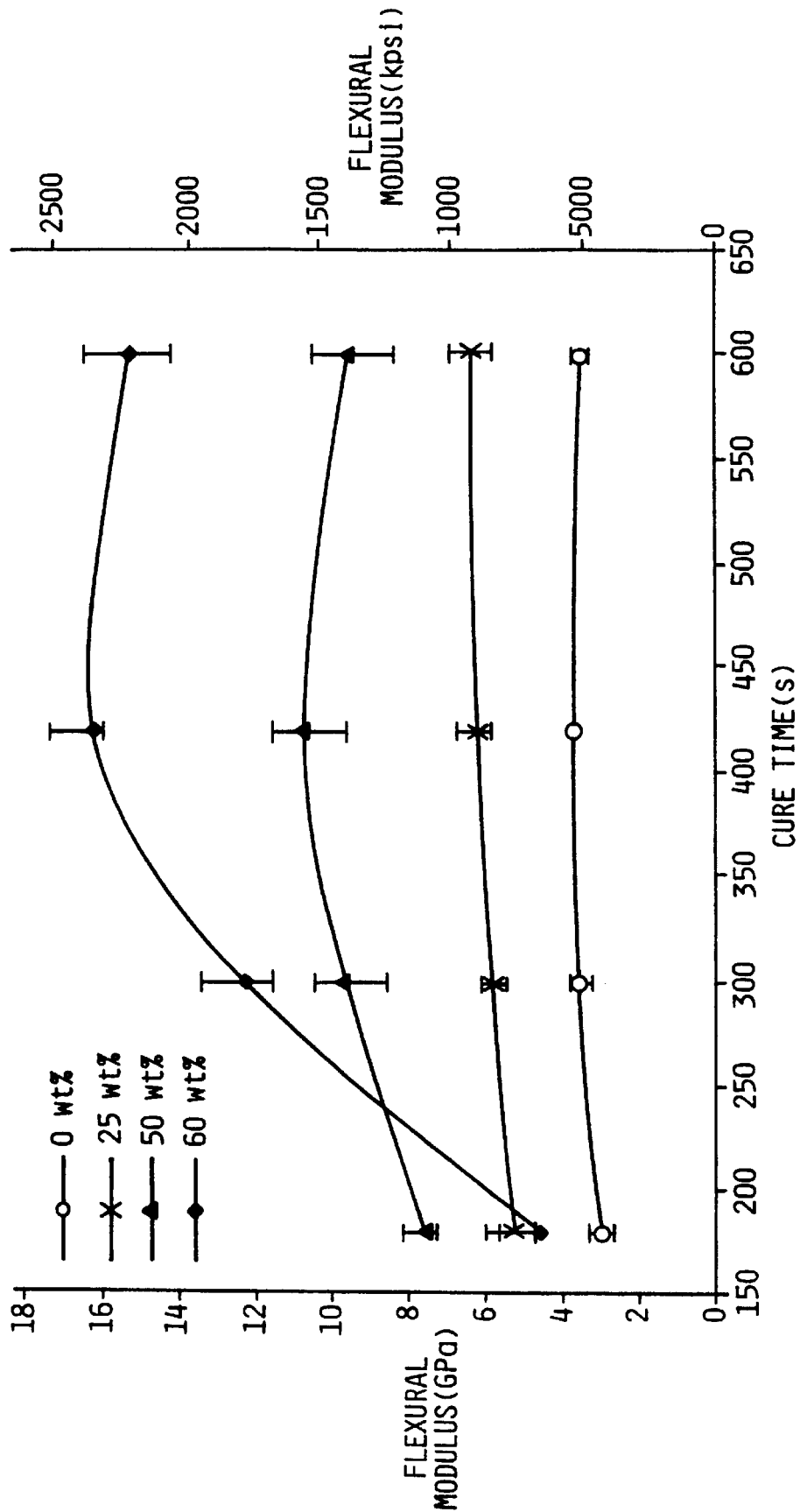
FIG. 8 is a graph of flexural modulus versus cure time for photocured DERAKANE 470-45/glass fiber composites which shows the effects of cure time and degree of fiber loading on the flexural modulus of the resulting composites.
Figure 9:
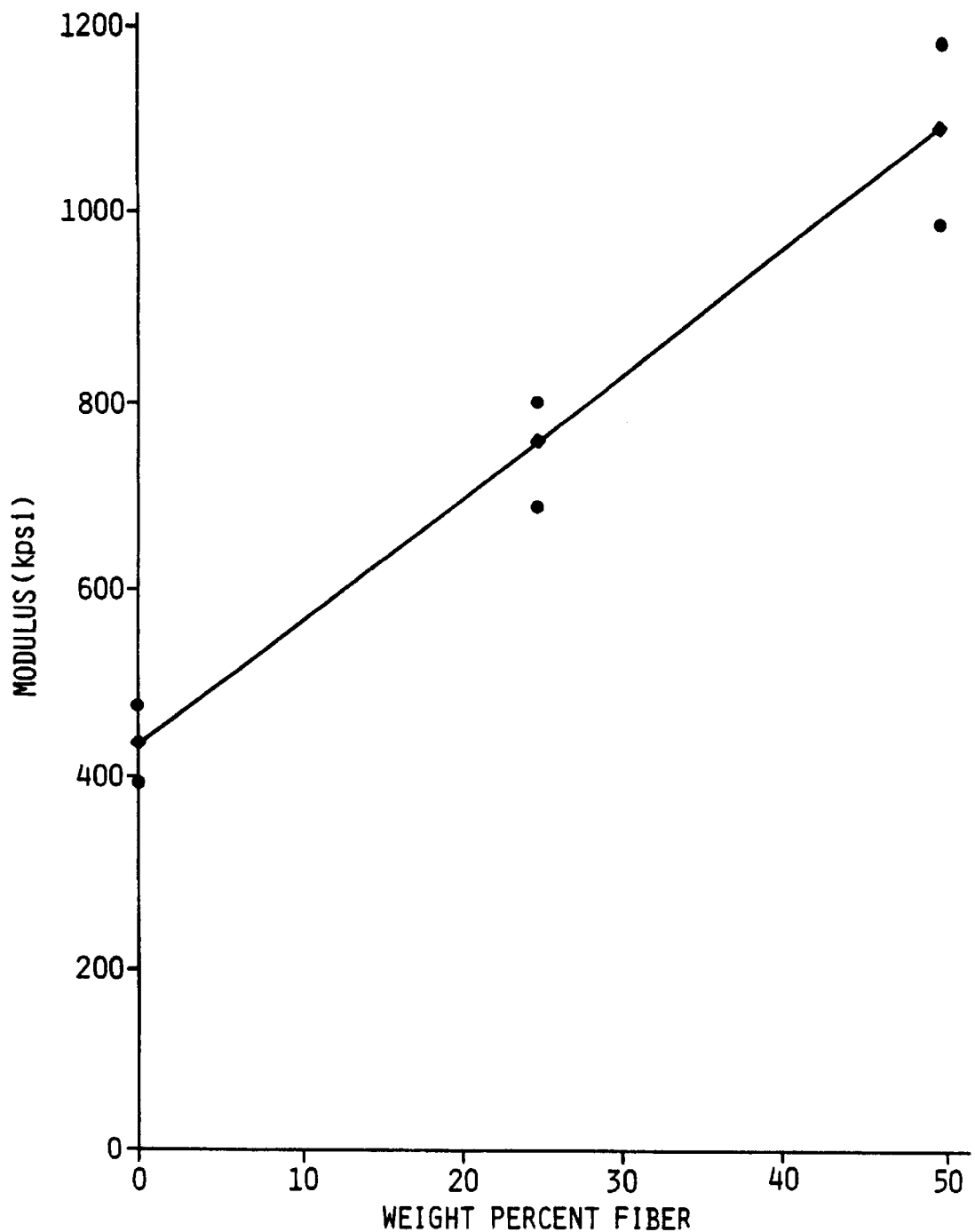
FIGS. 9–12 are graphs of flexural modulus versus degree of fiber loading for DERAKANE 470-45/glass fiber composites that have been photocured for three, five, seven and ten minutes, respectively, which illustrate the variance in the flexural modulus as the fiber loading and the cure time are varied.
Figure 10:
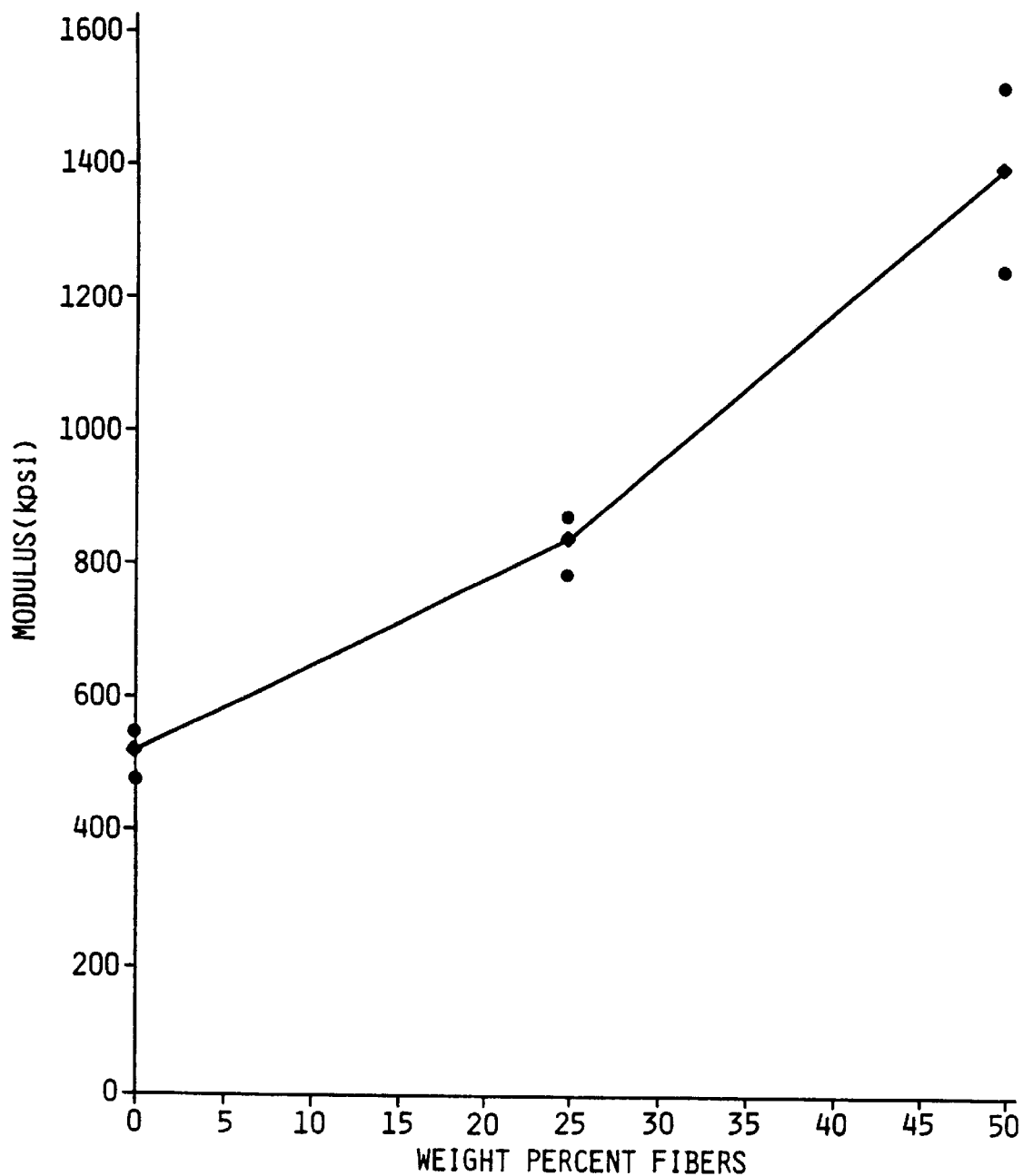
Figure 11:
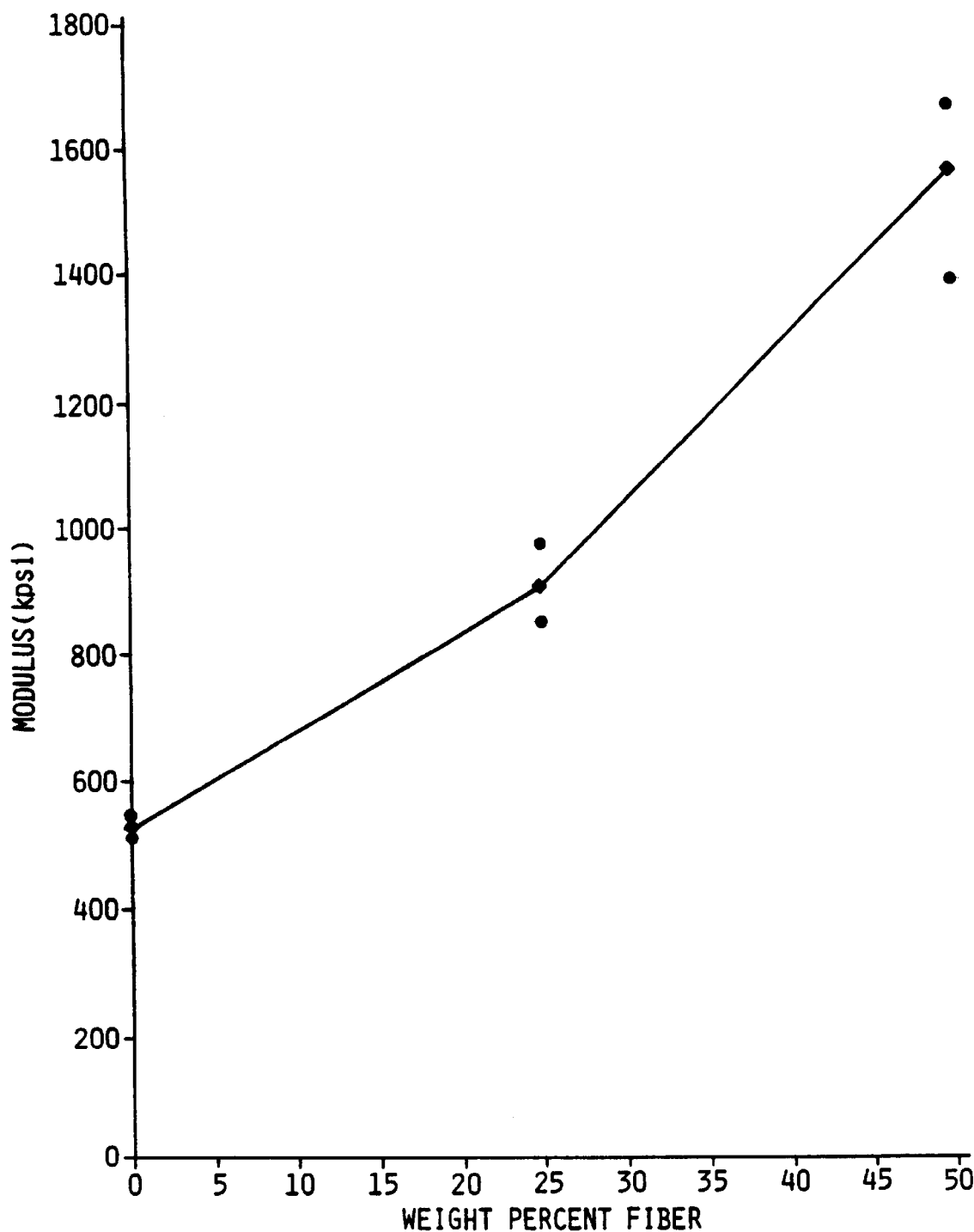
Figure 12:
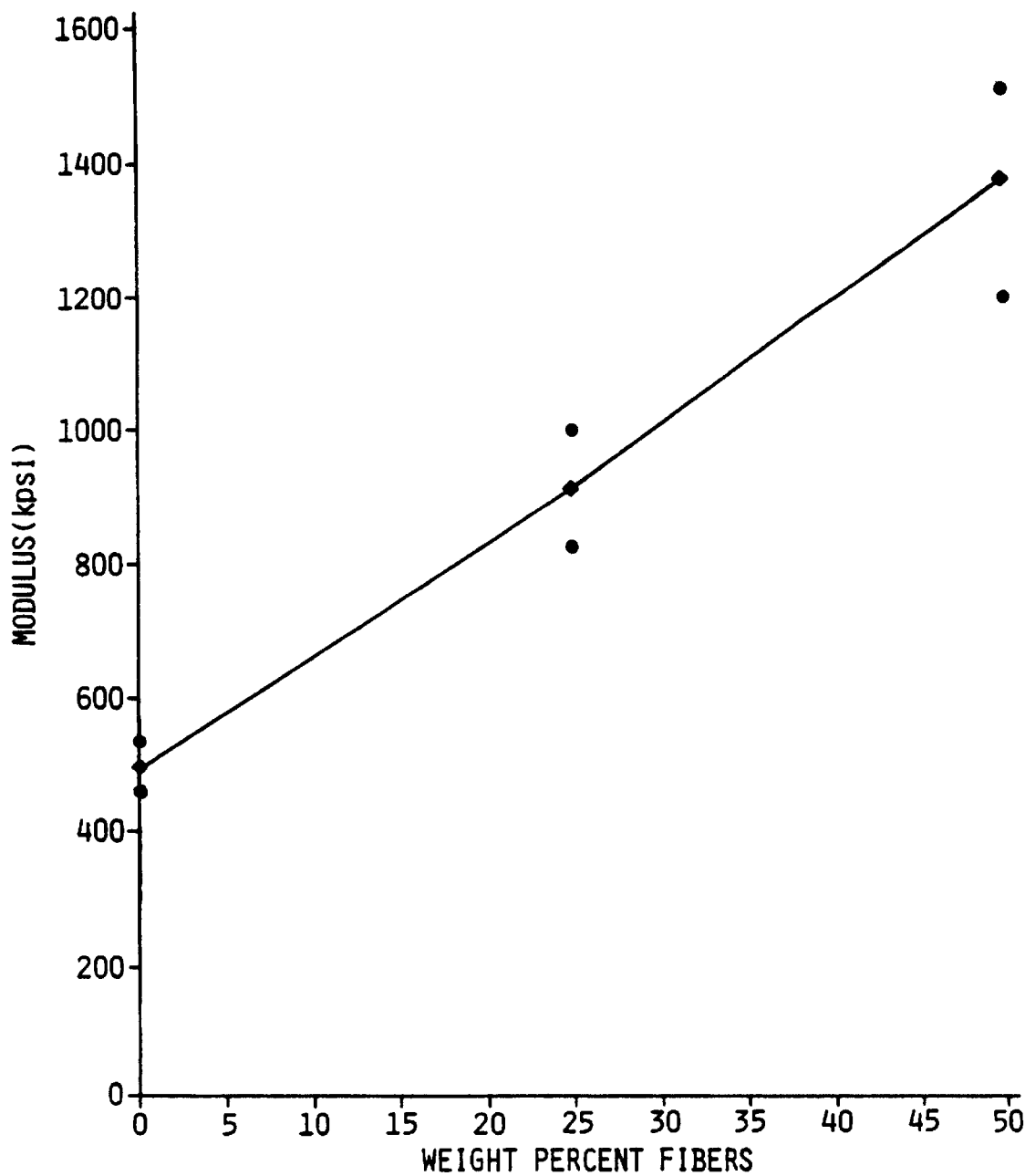

These results are shown in FIG. 8 (each point on the graph represents an average of at least 4 independent measurements, with the high and low values being depicted by error bars). The results shown in FIG. 8 indicate that after 420 seconds (7 minutes) of cure there is no further increase in the modulus of the material. It may also be noted that there is a slight decrease in flexural modulus at higher exposure times, although this decrease falls close to the limits of experimental error. Also, it is possible that the polymer is degraded under the UV light.

As expected, increasing the amount of fiber increases the flexural modulus of the samples. It can be seen that the flexural modulus increases by a factor of 3 at 50 wt % fiber loading.

EXAMPLE 13

This Example shows the dependence of the flexural modulus of a solid composite upon the level of reinforcement material included for various cure times.

The procedure employed and the equipment utilized were essentially the same as described in Example 12. 99.88% DERAKANE 470-45 and 0.06% BEE and 0.06% BME were placed in test tubes while the reinforcement material (the fibers of Example 12) level was at 0, 25 or 50%. Four sets of samples were prepared and cure times of 3, 5, 7, and 10 minutes were each used for each set of samples.

FIGS. 9–12 show, at the cure time used, how the modulus was effected as the fiber level increased. As seen in each figure, the modulus of the cured, solid part increased as the fiber level increased.

EXAMPLE 14

This Example illustrates the effects of initiating light intensity and cure time on the flexural modulus of photocured composites.

Figure 13:
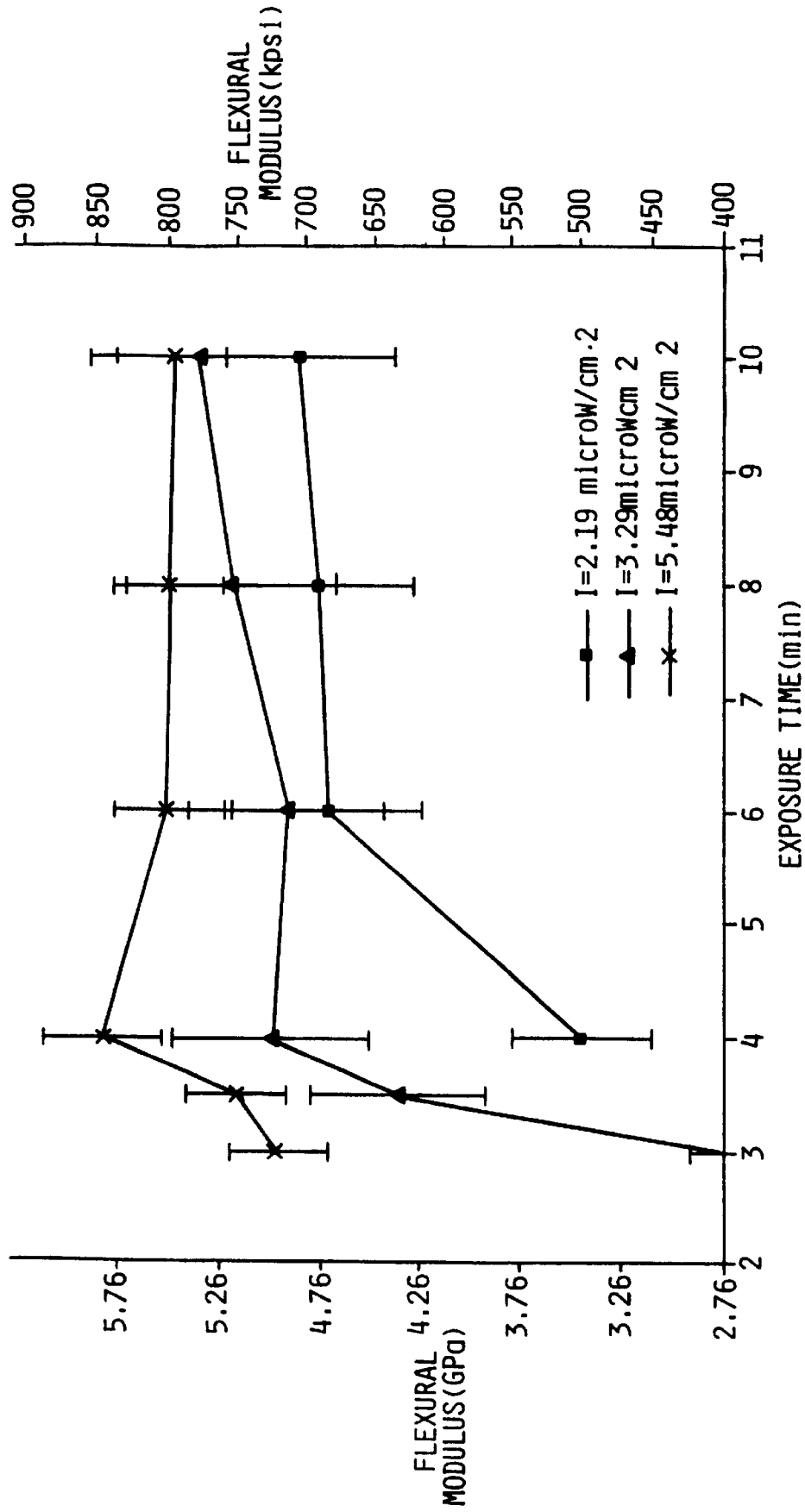
FIG. 13 is a graph of flexural modulus versus cure (exposure) time for photocured DERAKANE 470-45 containing 0.08 weight % of BEE, and also of BME, and 25 weight % powdered fiber, illustrating the variance in flexural modulus as the cure time and light intensity are varied.

Samples containing DERAKANE 470-45, 0.08 weight % BEE and 0.08 wt % BME and 25 weight % powdered fiber were polymerized under UV light at various light intensities, for different periods of time as shown in FIG. 13. The initiating light (from the 1000 watt lamp) was varied between 2.2, 3.3 and 5.5 $\mu W/cm^2$. As previously observed, increasing the time of cure increased the mechanical strength of the composite. It was also observed that increasing the intensity of the initiating light within the indicated range not only reduced the cure time, but also resulted in an increased flexural modulus of the final composite.

This Example demonstrates that increasing the intensity of initiating light results in shorter cure times as well as improved mechanical properties.

EXAMPLE 15

This Example illustrates the self-eliminating absorbance characteristic of a coinitiator system useful for cationically photopolymerizing appropriate monomer systems.

Anthracene dissolved in 1-propanol ($1 \times 10^{-2}$ wt. %) and UV9310 onium salt photoinitiator (GE Silicones, Waterford, N.Y.) comprised the coinitiator system. The resulting mixture (97.98 wt. % 1-propanol, 2 wt. % UV9310 and $1 \times 10^{-2}$ wt. % anthracene) were placed in a quartz cuvette, and the absorbance was measured. The solution was then exposed to a 100 watt Long Range UV Lamp intensity (approximately 3–5 $\mu W/cm^2$) for a period of minutes, and the absorbance over that period was measured. The monitored wavelength was 364 nm.

Figure 14:
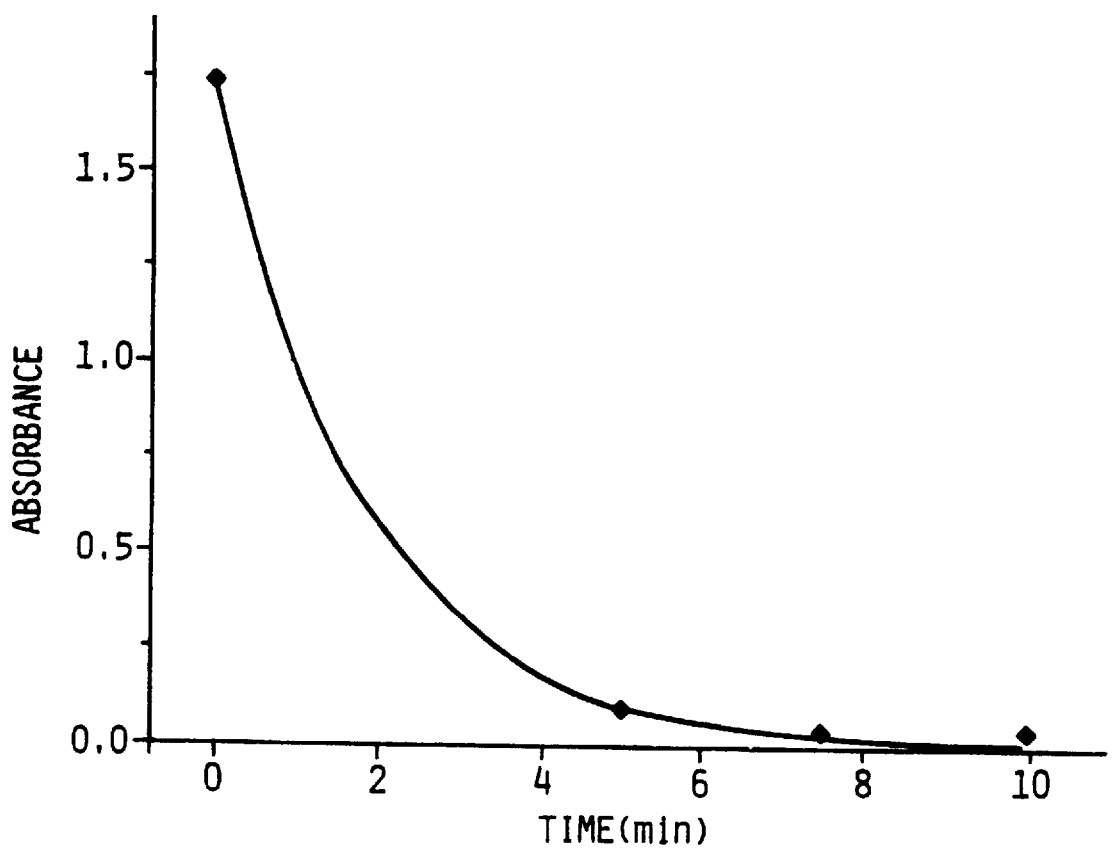
FIG. 14 illustrates the decay in absorbance of initiating light at 364 nm as a function of time for an anthracene/diaryliodonium coinitiator system which may be used to cationically photopolymerize an appropriate monomer system.

The data obtained is plotted in FIG. 14. As can be seen, exposure to the UV light caused the absorbance of the coinitiator system to decay exponentially.

This Example demonstrates a coinitiator system with self-eliminating characteristics which may be used in conjunction with epoxies, styrenics, vinyl ethers and other cationically polymerizable monomers/resins to produce thick and/or composite parts.

We claim:

1. A method for making a part having a defined thickness comprising providing a photopolymerizable composition including at least one monomer to be photopolymerized to a polymer and a photoinitiator having a self-eliminating absorbance and present in an amount sufficient to initiate the photopolymerization of the monomer present while allowing the absorbance to self-eliminate, said monomer not having unduly facile extractable hydrogens so as to adversely affect the photopolymerization and said monomer and polymer having minimal absorbance in the wavelength range where photopolymerization is initiated so that the absorbance of said photoinitiator is allowed to self-eliminate, providing a light source for emitting light in the ultraviolet wavelength range to excite the photoinitiator so as to initiate said photopolymerization, providing a mold having a cavity in the shape of said part and at least one side thereof allowing the light emitted from said light source to penetrate into the cavity of the mold, initiating operation of the light source to cause light to be emitted, filling said mold with said photopolymerizable composition, positioning said mold and said light source such that the light being emitted from said light source penetrates into the cavity of said mold, exposing the photopolymerizable composition to the light emitted for a time adequate to cure said composition throughout the thickness of the part being formed as the absorbance of the photoinitiator self-eliminates as the curing proceeds, and removing the part from the mold cavity.

2. The method of claim 1, wherein said monomer is an epoxy vinyl ester.

3. The method of claim 1, wherein said photoinitiator is a benzoin ether.

4. The method of claim 3, wherein said benzoin ether is benzoin ethyl ether.

5. The method of claim 3, wherein said benzoin ether is benzoin methyl ether.

6. The method of claim 3, wherein said benzoin ether is benzoin phenyl ether.

7. The method of claim 4, wherein said benzoin ether is present in an amount of from about 0.1 to 2.0 weight percent based upon the total weight of the photopolymerizable composition.

8. The method of claim 1 wherein a composite is made comprising a continuous polymer phase and a discontinuous reinforcement material phase and the reinforcement material is placed in the mold before the photopolymerizable composition is exposed to the light being emitted from the light source.

9. The method of claim 8 wherein the reinforcement material is placed in the mold before the mold is filled with the photopolymerizable composition.

10. The method of claim 9 wherein the reinforcement material is a preform.

11. The method of claim 8 wherein the reinforcement material is dispersed in the photopolymerizable composition and the mold is then filled with the resulting mixture.

12. The method of claim 8, wherein said reinforcement material is present in an amount of from about 5 to about 70 percent by weight based upon the total weight of the photopolymerizable composition and the reinforcement material.

13. The method of claim 8, wherein the reinforcement material is a member selected from the group consisting of chopped E-glass fibers, woven glass fiber mats and random glass fiber mats.

14. The method of claim 1, wherein said photopolymerization composition includes a filler.

15. The method of claim 14, wherein said filler is a member selected from the group consisting of powdered silica, famed silica, glass beads and microspheres.

16. The method of claim 1, wherein the light source is an ultraviolet light source.

17. The method of claim 1, wherein the wavelength range is about 320 to 360 nm.

18. The method of claim 1 wherein the part has a thickness of at least about 0.1 cm.

19. The method of claim 1, in which the thickness of the part is at least one centimeter.

20. A method for making a part having a defined thickness comprising providing a photopolymerizable composition including at least one monomer to be photopolymerized to a polymer and a photoinitiator having a self-eliminating absorbance and present in an amount sufficient to initiate the photopolymerization of the monomer present while allowing the absorbance to self-eliminate, providing a light source for emitting light in the ultraviolet wavelength range to excite the photoinitiator so as to initiate said photopolymerization, said photopolymerizable composition and the conditions of photopolymerization being selected such that said photoinitiator, upon being excited in said ultra-violet wavelength range during photopolymerization, sufficiently fragments into fragmented radicals which do not absorb in said ultraviolet wavelength range such that curing throughout the thickness of the part is effected, providing a mold having a cavity in the shape of said part and at least one side thereof allowing the light emitted from said light source to penetrate into the cavity of the mold, initiating operation of the light source to cause light to be emitted, filling said mold with said photopolymerizable composition, positioning said mold and said light source such that the light being emitted from said light source penetrates into the cavity of said mold, exposing the photopolymerizable composition to the light emitted for a time adequate to cure said composition throughout the thickness of the part being formed as the absorbance of the photoinitiator self-eliminates as the curing proceeds, and removing the part from the mold cavity.

21. The method of claim 20, in which the thickness of the part is at least one centimeter.

22. A method for making a part having a defined thickness comprising providing a photopolymerizable composition including at least one monomer to be photopolymerized to a polymer and a photoinitiator having a self-eliminating absorbance, a chemical structure consisting of at least two aromatic rings providing sufficient $\pi$ electronic structure to absorb light in the ultraviolet region of the wavelength spectrum, and present in an amount sufficient to initiate the photopolymerization of the monomer present while allowing the absorbance to self-eliminate, providing a light source for emitting light in the ultraviolet wavelength range to excite the photoinitiator so as to initiate said photopolymerization, said photopolymerizable composition and the conditions of photopolymerization being selected to allow the absorbance of said photoinitiator to self-eliminate, providing a mold having a cavity in the shape of said part and at least one side thereof allowing the light emitted from said light source to penetrate into the cavity of the mold, initiating operation of the light source to cause light to be emitted, filling said mold with said photopolymerizable composition, positioning said mold and said light source such that the light being emitted from said light source penetrates into the cavity of said mold, exposing the photopolymerizable composition to the light emitted for a time adequate to cure said composition throughout the thickness of the part being formed as the absorbance of the photoinitiator self-eliminates as the curing proceeds, and removing the part from the mold cavity.

23. The method of claim 22, wherein said aromatic rings are conjugated.

24. The method of claim 22, in which the thickness of the part is at least one centimeter.

25. A method for making a part having a defined thickness comprising providing a photopolymerizable composition including at least one monomer to be photopolymerized via cationic polymerization to a polymer and a coinitiator system having a self-eliminating absorbance and present in an amount sufficient to initiate the photopolymerization of the monomer present while allowing the absorbance to self-eliminate, said coinitiator system being an anthracene photosensitizer and an onium salt, providing a light source for emitting light in a wavelength range to excite the coinitiator system so as to initiate said photopolymerization, said photopolymerizable composition and the conditions of photopolymerization being selected to allow the absorbance to self-eliminate, providing a mold having a cavity in the shape of said part and at least one side thereof allowing the light emitted from said light source to penetrate into the cavity of the mold, initiating operation of the light source to cause light to be emitted, filling said mold with said photopolymerizable composition, positioning said mold and said light source such that the light being emitted from said light source penetrates into the cavity of said mold, exposing the photopolymerizable composition to the light emitted for a time adequate to cure said composition throughout the thickness of the part being formed as the absorbance of the coinitiator system self-eliminates as the curing proceeds, and removing the part from the mold cavity.

26. The method of claim 25, wherein the monomers to be cationically polymerized are members selected from the group consisting of epoxides, vinyl ethers, styrenes and propenyl ethers.

27. A method for making a part having a defined thickness comprising providing a photopolymerizable composition including at least one monomer to be photopolymerized to a polymer and a photoinitiator having a self-eliminating absorbance and present in an amount sufficient to initiate the photopolymerization of the monomer present while allowing the absorbance to self-eliminate, said monomer not having unduly facile extractable hydrogens so as to adversely affect the photopolymerization and said monomer and polymer having minimal absorbance in the wavelength range where photopolymerization is initiated so that the absorbance of said photoinitiator is allowed to self-eliminate, providing a light source for emitting light in the ultraviolet wavelength range to excite the photoinitiator so as to initiate said photopolymerization, providing a mold having a cavity in the shape of said part, filling said mold with said photopolymerizable composition, initiating operation of the light source to cause light to be emitted and to penetrate into the photopolymerizable composition, and exposing the photopolymerizable composition to the light emitted for a time adequate to cure said composition throughout the thickness of the part being formed as the absorbance of the photoinitiator self-eliminates as the curing proceeds.

28. The method of claim 27, in which the thickness of the part is at least one centimeter.

29. The method of claim 27, wherein the wavelength range is about 320 to 360 nm.

30. A method for making a part having a defined thickness comprising providing a photopolymerizable composition including at least one monomer to be photopolymerized via cationic polymerization to a polymer and a coinitiator system having a self-eliminating absorbance and present in an amount sufficient to initiate the photopolymerization of the monomer present while allowing the absorbance to self-eliminate, said coinitiator system being an anthracene photosensitizer and an onium salt, providing a light source for emitting light in a wavelength range to excite the coinitiator system so as to initiate said photopolymerization, said photopolymerizable composition and the conditions of photopolymerization being selected to allow the absorbance to self-eliminate, providing said photopolymerizable composition in the shape of said part, initiating operation of the light source to cause light to be emitted and to penetrate into said photopolymerizable composition, and exposing the photopolymerizable composition to the light emitted for a time adequate to cure said composition throughout the thickness of the part being formed as the absorbance of the coinitiator system self-eliminates as the curing proceeds.

31. The method of claim 30, wherein the monomers to be cationically polymerized are members selected from the group consisting of epoxides, vinyl ethers, styrenes and propenyl ethers.

* * * * *

UNITED STATES PATENT AND TRADEMARK OFFICE
CERTIFICATE OF CORRECTION

PATENT NO. : 5,855,837
DATED : January 5, 1999
INVENTOR(S) : Alec B. Scranton, Bharath Rangarajan, and Lindsay S. Coons It is certified that errors appear in the above-identified patent and that said Letters Patent is hereby corrected as shown below:

Col. 3, ll. 26-27, "U.S. Pat." should not begin a new paragraph.

Col. 5, l. 26, "characteristicsindicative" should read --- characteristics indicative ---.

Col. 9, l. 1, "of" should read --- Of ---.

Col. 11, l. 33, "(FIG. 1B).(FIG. 1A)" should read --- (FIG. 1A) ---.

Col. 11, l. 38, "(Step 4 FIG.1D)" should read --- (Step 4, FIG 1.D) ---.

Claim 20, col. 21, l. 61, "ultra-violet" should read --- ultraviolet ---.

Signed and Sealed this

Twenty-fourth Day of October, 2000

*Attest:*

Q. TODD DICKINSON

*Attesting Officer*     *Director of Patents and Trademarks*